(12) United States Patent
Ogawa et al.

(10) Patent No.: US 12,292,423 B2
(45) Date of Patent: May 6, 2025

(54) LIQUID CHROMATOGRAPHIC SYSTEM AND METHOD OF CLEANING THE SAME, AND COMPUTER READABLE MEDIUM

(71) Applicant: SHIMADZU CORPORATION, Kyoto (JP)

(72) Inventors: Keisuke Ogawa, Columbia, MD (US); Andy Sasaki, Columbia, MD (US); Kerry Hill, Columbia, MD (US); Timothy Lee, Columbia, MD (US)

(73) Assignee: SHIMADZU CORPORATION, Kyoto (JP)

( * ) Notice: Subject to any disclaimer, the term of this patent is extended or adjusted under 35 U.S.C. 154(b) by 432 days.

(21) Appl. No.: 17/971,606

(22) Filed: Oct. 23, 2022

(65) Prior Publication Data
US 2023/0132731 A1 May 4, 2023

Related U.S. Application Data

(60) Provisional application No. 63/273,184, filed on Oct. 29, 2021.

(51) Int. Cl.
*G01N 30/46* (2006.01)
*B01D 15/16* (2006.01)
(Continued)

(52) U.S. Cl.
CPC ............ *G01N 30/46* (2013.01); *B01D 15/16* (2013.01); *B01D 15/18* (2013.01); *G01N 30/32* (2013.01);
(Continued)

(58) Field of Classification Search
None
See application file for complete search history.

(56) References Cited

U.S. PATENT DOCUMENTS 6,911,151 B1 * 6/2005 Muller-Kuhrt ....... G01N 30/466
210/90
7,178,414 B1 * 2/2007 Kokosa ................. G01N 35/10
73/864.21
(Continued)

FOREIGN PATENT DOCUMENTS

CN 1834642 A 9/2006
CN 103907020 A 7/2014
(Continued)

OTHER PUBLICATIONS

Chinese Office Action dated Sep. 25, 2024 in corresponding Chinese Application No. 202211300334.1, with Machine Translation.
(Continued)

*Primary Examiner* — Peter J Macchiarolo
*Assistant Examiner* — Jermaine L Jenkins
(74) *Attorney, Agent, or Firm* — Renner, Otto, Boisselle & Sklar, LLP

(57) ABSTRACT

In a liquid chromatographic system, a processor is configured to analyze a sample through a first stream which is an analysis flow path including a first column, to obtain at least one of a result of analysis for quality control of the first stream and information that specifies a sample to be analyzed in the first stream, to specify, among two or more combinations of a cleaning method and a cleaning execution condition, a first combination including an execution condition to which at least one of the result of analysis for quality control and the information corresponds, and to drive one or more cleaning pumps in accordance with the cleaning method included in the first combination.

13 Claims, 29 Drawing Sheets

(51) Int. Cl.
*B01D 15/18* (2006.01)
*G01N 30/02* (2006.01)
*G01N 30/32* (2006.01)
*G01N 30/72* (2006.01)

(52) U.S. Cl.
CPC ... *G01N 30/7233* (2013.01); *G01N 2030/027* (2013.01); *G01N 2030/326* (2013.01)

(56) References Cited

U.S. PATENT DOCUMENTS

| | | | | |
|---|---|---|---|---|
| 7,318,900 | B2* | 1/2008 | DeMarco | G01N 30/88 210/143 |
| 9,638,674 | B2* | 5/2017 | Morikawa | G01N 30/24 |
| 10,416,133 | B2* | 9/2019 | Nakashima | G01N 30/8644 |
| 10,935,473 | B2* | 3/2021 | Wiederin | H01J 49/0431 |
| 11,635,443 | B2* | 4/2023 | Limbach | G01N 33/543 26 435/5 |
| 12,085,545 | B2* | 9/2024 | Schuhn | G01N 30/86 |
| 12,174,160 | B2* | 12/2024 | Stoll | G01N 30/463 |
| 12,222,337 | B2* | 2/2025 | Kamata | G01N 30/28 |
| 2006/0207941 | A1 | 9/2006 | Morikawa | |
| 2019/0086371 | A1 | 3/2019 | Lauber et al. | |
| 2021/0223218 | A1 | 7/2021 | Maekawa | |
| 2021/0285919 | A1 | 9/2021 | Watanabe et al. | |
| 2022/0011280 | A1 | 1/2022 | Ogata et al. | |
| 2022/0107293 | A1 | 4/2022 | Nogami et al. | |
| 2023/0037141 | A1 | 2/2023 | Quint et al. | |
| 2023/0128516 | A1 | 4/2023 | Fujito et al. | |
| 2023/0132731 | A1 | 5/2023 | Ogawa et al. | |
| 2023/0136667 | A1 | 5/2023 | Ogawa et al. | |

FOREIGN PATENT DOCUMENTS

| | | |
|---|---|---|
| CN | 212693690 U | 3/2021 |
| CN | 113167772 A | 7/2021 |
| CN | 113391011 A | 9/2021 |
| CN | 113396328 A | 9/2021 |
| WO | 2017/216934 A1 | 12/2017 |

OTHER PUBLICATIONS

Notice of Allowance in copending U.S. Appl. No. 17/971,605 dated Dec. 11, 2024.
Office Action in copending U.S. Appl. No. 17/971,604 dated Oct. 24, 2024.
Chinese Office Action dated Jul. 22, 2024 in corresponding Chinese Application No. 202211300453.7, with Machine Translation.
Office Action in copending U.S. Appl. No. 17/971,605 dated Aug. 23, 2024.

* cited by examiner

FIG.20

|  | 1ST ANALYSIS FLOW PATH | | |
|---|---|---|---|
|  | SAMPLE SUCTION | SAMPLE INJECTION | ELUENT INJECTION |
| 1ST ANALYSIS FLOW PATH | 3RD OR 4TH CLEANING PATTERN | IMPOSSIBLE | 5TH CLEANING PATTERN |
| 2ND ANALYSIS FLOW PATH | 3RD OR 4TH CLEANING PATTERN | 3RD OR 4TH CLEANING PATTERN | ANY ONE OF 2ND, 4TH, AND 5TH CLEANING PATTERNS |
| 3RD ANALYSIS FLOW PATH | 3RD OR 4TH CLEANING PATTERN | 3RD OR 4TH CLEANING PATTERN | ANY ONE OF 2ND, 4TH, AND 5TH CLEANING PATTERNS |
| 4TH ANALYSIS FLOW PATH | 3RD OR 4TH CLEANING PATTERN | 3RD OR 4TH CLEANING PATTERN | ANY ONE OF 2ND, 4TH, AND 5TH CLEANING PATTERNS |

FIG.25

| METHOD FILE | ANALYSIS METHOD | CLEANING METHOD |
|---|---|---|
| (1) | • ELUENT FLOW RATE: R1 | • EXECUTION CONDITION: QC VALUE ≥ V1<br>• TARGET SAMPLE: K1<br>• CLEANING CONTENT: 1ST CLEANING PATTERN [10min]<br>　　　　　　　　　　　2ND CLEANING PATTERN [10min] |
| (2) | • ELUENT FLOW RATE: R1 | • EXECUTION CONDITION: QC VALUE < V1<br>• TARGET SAMPLE: K1<br>• CLEANING CONTENT: 1ST CLEANING PATTERN [5min]<br>　　　　　　　　　　　2ND CLEANING PATTERN [5min] |
| (3) | • ELUENT FLOW RATE: R1 | • EXECUTION CONDITION: QC VALUE ≥ V1<br>• TARGET SAMPLE: OTHER THAN K1<br>• CLEANING CONTENT: 1ST CLEANING PATTERN [9min]<br>　　　　　　　　　　　2ND CLEANING PATTERN [9min] |
| (4) | • ELUENT FLOW RATE: R1 | • EXECUTION CONDITION: QC VALUE < V1<br>• TARGET SAMPLE: OTHER THAN K1<br>• CLEANING CONTENT: 1ST CLEANING PATTERN [4min]<br>　　　　　　　　　　　2ND CLEANING PATTERN [4min] |
| ... | ... | ... |

FIG.28

| METHOD FILE | ANALYSIS METHOD | CLEANING METHOD |
|---|---|---|
| (1) | • ELUENT FLOW RATE: R1 | • EXECUTION CONDITION: QC VALUE ≥ V1<br>• CLEANING CONTENT: 1ST CLEANING PATTERN [10min]<br>　　　　　　　　　　　2ND CLEANING PATTERN [10min] |
| (2) | • ELUENT FLOW RATE: R1 | • EXECUTION CONDITION: QC VALUE < V1<br>• CLEANING CONTENT: 1ST CLEANING PATTERN [5min]<br>　　　　　　　　　　　2ND CLEANING PATTERN [5min] |
| ‥ | ‥ | ‥ |

FIG.29

| METHOD FILE | ANALYSIS METHOD | CLEANING METHOD |
| --- | --- | --- |
| (1) | ・ELUENT FLOW RATE: R1 | ・TARGET SAMPLE: K1<br>・CLEANING CONTENT: 1ST CLEANING PATTERN [10min]<br>2ND CLEANING PATTERN [10min] |
| (2) | ・ELUENT FLOW RATE: R1 | ・TARGET SAMPLE: K2, K3<br>・CLEANING CONTENT: 1ST CLEANING PATTERN [5min]<br>2ND CLEANING PATTERN [5min] |
| ‥ | ‥ | ‥ |

LIQUID CHROMATOGRAPHIC SYSTEM AND METHOD OF CLEANING THE SAME, AND COMPUTER READABLE MEDIUM

BACKGROUND OF THE INVENTION

Field of the Invention

The present disclosure relates to a liquid chromatographic system and a method of cleaning the same, and a computer readable medium.

Description of the Background Art

Liquid chromatography is a technology for separating a component contained in a sample by introducing a sample to be analyzed into a column together with an eluent which is a mobile phase. The component in the sample separated by liquid chromatography may be analyzed by a mass spectrometer based on a property of that component or the like.

WO2017/216934 describes a chromatographic mass spectrometry device including a plurality of streams for a liquid chromatogram for the purpose of improvement in throughput of analysis. The chromatographic mass spectrometry device described in WO2017/216934 includes three flow paths to which a column is connected. In the chromatographic mass spectrometry device described in WO2017/216934, a mass spectrometer is connected to any one of the three flow paths through a selector valve connected thereto.

In a liquid chromatographic system such as a chromatographic mass spectrometry device, some of a sample analyzed in preceding analyses may be accumulated as contamination in a needle in an autosampler or a valve or a column in a stream. Such accumulation of contamination is also called carryover. Preceding analyses may be carried over to present analysis, which leads to detection by a mass spectrometry device of a peak derived from a sample which is not essentially a measurement target. Therefore, in the liquid chromatographic system, the stream is cleaned after each analysis. A condition for cleaning, however, has conventionally been different depending on a property of a sample to be measured or a type of a column or a pipe included in a stream, and hence it has been difficult to avoid occurrence of carryover only based on a specific cleaning condition, or in the event of occurrence of carryover, it has been difficult to lessen or eliminate carryover in a short period of time.

SUMMARY OF THE INVENTION

An object of the present disclosure is to provide a technique to appropriately clean a stream in a liquid chromatographic system.

A liquid chromatographic system according to one aspect of the present disclosure includes a first column that separates a sample for each component, a first stream which is an analysis flow path including the first column, one or more cleaning pumps that supply a cleaning solution to the first stream, a memory in which two or more combinations of a cleaning method and a cleaning execution condition are stored, and a processor. The processor is configured to analyze a sample through the first stream and obtain at least one of a result of analysis for quality control of the first stream and information that specifies a sample to be analyzed in the first stream, specify a first combination including an execution condition to which at least one of the result of analysis for quality control and the information corresponds, among the two or more combinations, and drive the one or more cleaning pumps in accordance with the cleaning method included in the first combination.

A liquid chromatographic system according to another aspect of the present disclosure includes a first stream including an analysis flow path, one or more cleaning pumps that supply a cleaning solution to the first stream, a processor, and a memory in which one or more analysis conditions and one or more cleaning methods are stored. In the memory, each of the one or more analysis conditions is combined with any one of the one or more cleaning methods. The processor determines to use the first stream for analysis of a sample, and after analysis in accordance with any one analysis condition of the one or more analysis conditions, the processor has the one or more cleaning pumps driven in accordance with one cleaning method combined with the one analysis condition among the one or more cleaning methods.

A cleaning method according to one aspect of the present disclosure is a method of cleaning a liquid chromatographic system. The liquid chromatographic system includes a first stream including an analysis flow path including a first analysis column, one or more pumps that supply a liquid to the first stream, and a memory in which two or more combinations of a cleaning method and a cleaning execution condition are stored. The cleaning method includes determining to use the first stream for analysis of a sample, obtaining at least one of a result of analysis for quality control of the first stream and information that specifies a sample to be analyzed in the first stream in response to determination to use the first stream for analysis of the sample, specifying a first combination including an execution condition to which at least one of the result of analysis for quality control and the information corresponds, among the two or more combinations, and driving the one or more pumps in accordance with the cleaning method included in the first combination.

A computer readable medium according to one aspect of the present disclosure is a non-transitory computer readable medium having a program recorded thereon. The program, when executed by a processor of a controller, causes the controller to perform determining to use, in a liquid chromatographic system, for analysis of a sample, a first stream including an analysis flow path including a first analysis column, obtaining at least one of a result of analysis for quality control of the first stream and information that specifies a sample to be analyzed in the first stream in response to determination to use the first stream for analysis of the sample, specifying, among two or more combinations of a cleaning method and a cleaning execution condition, a first combination including an execution condition to which at least one of the result of analysis for quality control and the information corresponds, and driving one or more pumps that supply a liquid to the first stream in accordance with the cleaning method included in the first combination.

According to the present disclosure, a stream is appropriately cleaned in a liquid chromatographic system.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a diagram showing a cleaning pattern that can be selected in first to fourth analysis flow paths.

FIG. 25 is a diagram schematically showing an exemplary data configuration in a method file database.

FIG. 28 is a diagram showing a first modification of the method file database.

FIG. 29 is a diagram showing a second modification of the method file database.

DESCRIPTION OF THE PREFERRED EMBODIMENTS

Figure 1:
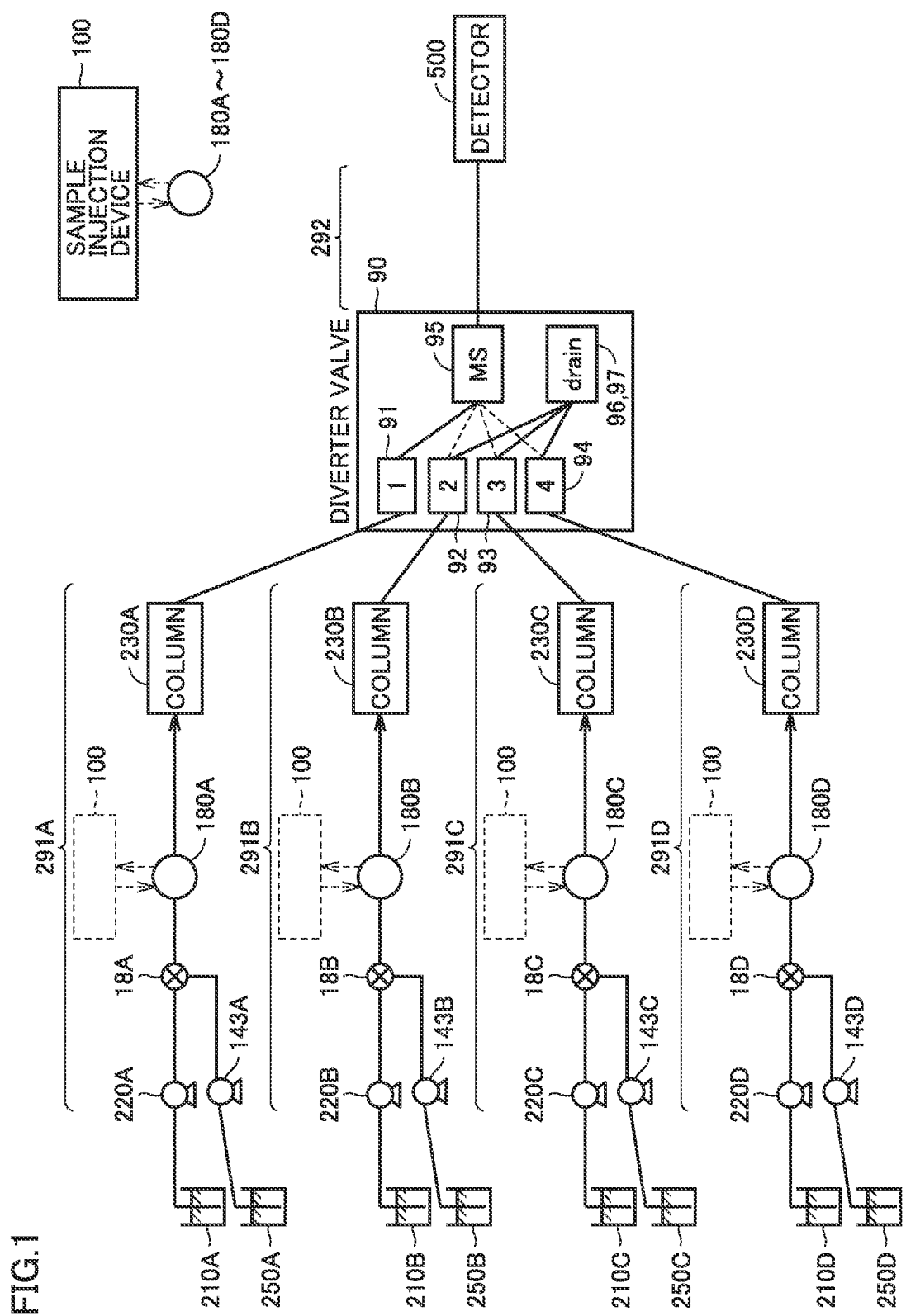
FIG. 1 is a diagram of a schematic construction of a liquid chromatographic system.

An embodiment of the present disclosure will be described in detail below with reference to the drawings. The same or corresponding elements in the drawings have the same reference characters allotted and description thereof will not be repeated.

<Overall Construction>

FIG. 1 is a diagram of a schematic construction of a liquid chromatographic system 10. In liquid chromatographic system 10, flow paths 291A to 291D used for analysis of a sample are provided. Flow paths 291A to 291D include high-pressure valves 180A to 180D, respectively. Flow paths 291A to 291D are connected to a flow path 292 which leads to a detector 500.

A diverter valve 90 is arranged between flow paths 291A to 291D and flow path 292.

Flow paths 291A to 291D are each switched between a first flow path which leads to diverter valve 90 via a sample injection device 100 and a second flow path which leads to diverter valve 90 not via sample injection device 100. Sample injection device 100 includes a needle for injection of a sample.

Diverter valve 90 includes ports 91 to 97. Flow path 291A is connected to port 91. Flow path 291B is connected to port 92. Flow path 291C is connected to port 93. Flow path 291D is connected to port 94. Detector 500 is connected to port 95. A liquid discharge pipe (not shown) is connected to ports 96 and 97. Port 95 corresponds to a main port. Ports 96 and 97 correspond to a drain port.

Diverter valve 90 implements a selector valve that switches an object to be connected to port 95 among ports 91 to 94. Through diverter valve 90, any one of flow paths 291A to 291D is connected to flow path 292 which leads to detector 500.

A construction of flow path 291A will be described in detail.

Flow path 291A is a flow path that includes high-pressure valve 180A and extends from high-pressure valve 180A in a direction toward a column 230A. Flow path 291A is switched by high-pressure valve 180A between the first flow path which leads to column 230A via sample injection device 100 and the second flow path which leads to column 230A not via sample injection device 100.

In flow path 291A, at least a high-pressure pump 220A, a cleaning pump 143A, a cleaning valve 18A, high-pressure valve 180A, and column 230A are arranged. High-pressure valve 180A is connected to column 230A. Column 230A is filled with a stationary phase for separating a component in a sample.

High-pressure valve 180A is connected to high-pressure pump 220A and cleaning pump 143A with cleaning valve 18A being interposed. High-pressure pump 220A supplies an eluent in a container 210A to high-pressure valve 180A. Cleaning pump 143A supplies a rinse solution in a container 250A to high-pressure valve 180A. Any one of high-pressure pump 220A and cleaning pump 143A is connected to high-pressure valve 180A through cleaning valve 18A. Consequently, the eluent or the rinse solution is supplied to high-pressure valve 180A.

When flow path 291A is set to the first flow path that passes through sample injection device 100, the eluent supplied from high-pressure pump 220A to high-pressure valve 180A flows to column 230A via sample injection device 100. The sample held in sample injection device 100 is sent to column 230A over the eluent.

When flow path 291A is set to the second flow path that does not pass through sample injection device 100, the eluent supplied from high-pressure pump 220A to high-pressure valve 180A flows to column 230A without passing through sample injection device 100. When the sample has already been injected into column 230A, the eluent is sent from high-pressure valve 180A to column 230A through the second flow path. Separation of the sample in column 230A thus proceeds.

Column 230A is connected to port 91 of diverter valve 90. When port 91 and port 95 are connected to each other in diverter valve 90, a component in the sample separated in column 230A flows to detector 500 via diverter valve 90. Consequently, the component in the sample separated in column 230A is analyzed by detector 500 implemented by a mass spectrometer or the like.

When cleaning pump 143A and high-pressure valve 180A are connected to each other through cleaning valve 18A, the rinse solution is supplied to high-pressure valve 180A. High-pressure valve 180A can allow a flow of the rinse solution to column 230A through or not through sample injection device 100. Thus, both of the first flow path leading to column 230A via sample injection device 100 and the second flow path leading to column 230A not via sample injection device 100 can be cleaned.

When port 91 and port 95 of diverter valve 90 are connected to each other, the rinse solution flows from column 230A to detector 500 via port 91 and port 95 of diverter valve 90. Consequently, flow path 292 leading from diverter valve 90 toward detector 500 is also cleaned. When port 91 and ports 96 and 97 of diverter valve 90 are connected to each other, port 91 and ports 96 and 97 of the diverter valve are cleaned.

The construction of flow path 291A is described above in detail. The construction of flow paths 291B to 291D will now be described.

Flow path 291B is a flow path that includes high-pressure valve 180B and extends from high-pressure valve 180B in a direction toward column 230B. Flow path 291B is switched by high-pressure valve 180B between the first flow path which leads to column 230B via sample injection device 100 and the second flow path which leads to column 230B not via sample injection device 100.

In flow path 291B, at least a high-pressure pump 220B that sucks an eluent from a container 210B, a cleaning pump 143B that sucks a rinse solution from a container 250B, a cleaning valve 18B, high-pressure valve 180B, and column 230B are arranged.

Flow path 291C is a flow path that includes high-pressure valve 180C and extends from high-pressure valve 180C in a direction toward column 230C. Flow path 291C is switched by high-pressure valve 180C between the first flow path which leads to column 230C via sample injection device 100 and the second flow path which leads to column 230C not via sample injection device 100.

In flow path 291C, at least a high-pressure pump 220C that sucks an eluent from a container 210C, a cleaning pump 143C that sucks a rinse solution from a container 250C, a cleaning valve 18C, high-pressure valve 180C, and column 230C are arranged.

Flow path 291D is a flow path that includes high-pressure valve 180D and extends from high-pressure valve 180D in a direction toward column 230D. Flow path 291D is switched by high-pressure valve 180D between the first flow path which leads to column 230D via sample injection device 100 and the second flow path which leads to column 230D not via sample injection device 100.

In flow path 291D, at least a high-pressure pump 220D that sucks an eluent from a container 210D, a cleaning pump 143D that sucks a rinse solution from a container 250D, a cleaning valve 18D, high-pressure valve 180D, and column 230D are arranged.

Thus, flow paths 291B to 291D are similar in construction to flow path 291A. Therefore, detailed description of flow path 291A that has already been provided is applied as detailed description of flow paths 291B to 291D.

Flow path 291A, flow path 291B, flow path 291C, and flow path 291D are also referred to below as a first analysis flow path 291A, a second analysis flow path 291B, a third analysis flow path 291C, and a fourth analysis flow path 291D, respectively. First analysis flow path 291A, second analysis flow path 291B, third analysis flow path 291C, and fourth analysis flow path 291D are each switched between the first flow path which leads to diverter valve 90 via sample injection device 100 and the second flow path which leads to diverter valve 90 not via sample injection device 100.

Liquid chromatographic system 10 can switch a flow path to be used for analysis among first analysis flow path 291A, second analysis flow path 291B, third analysis flow path 291C, and fourth analysis flow path 291D. Therefore, according to liquid chromatographic system 10, detector 500 can successively analyze various samples. Consequently, liquid chromatographic system 10 can achieve improved analysis efficiency.

Liquid chromatographic system 10 further includes cleaning pump 143A corresponding to first analysis flow path 291A, cleaning pump 143B corresponding to second analysis flow path 291B, cleaning pump 143C corresponding to third analysis flow path 291C, and cleaning pump 143D corresponding to fourth analysis flow path 291D. Such a construction allows cleaning of the flow paths in various patterns in liquid chromatographic system 10.

For example, when first analysis flow path 291A is being used for analysis of a sample, a desired flow path among second analysis flow path 291B, third analysis flow path 291C, and fourth analysis flow path 291D can be cleaned.

<Construction of Liquid Chromatographic System 10>

Figure 2:
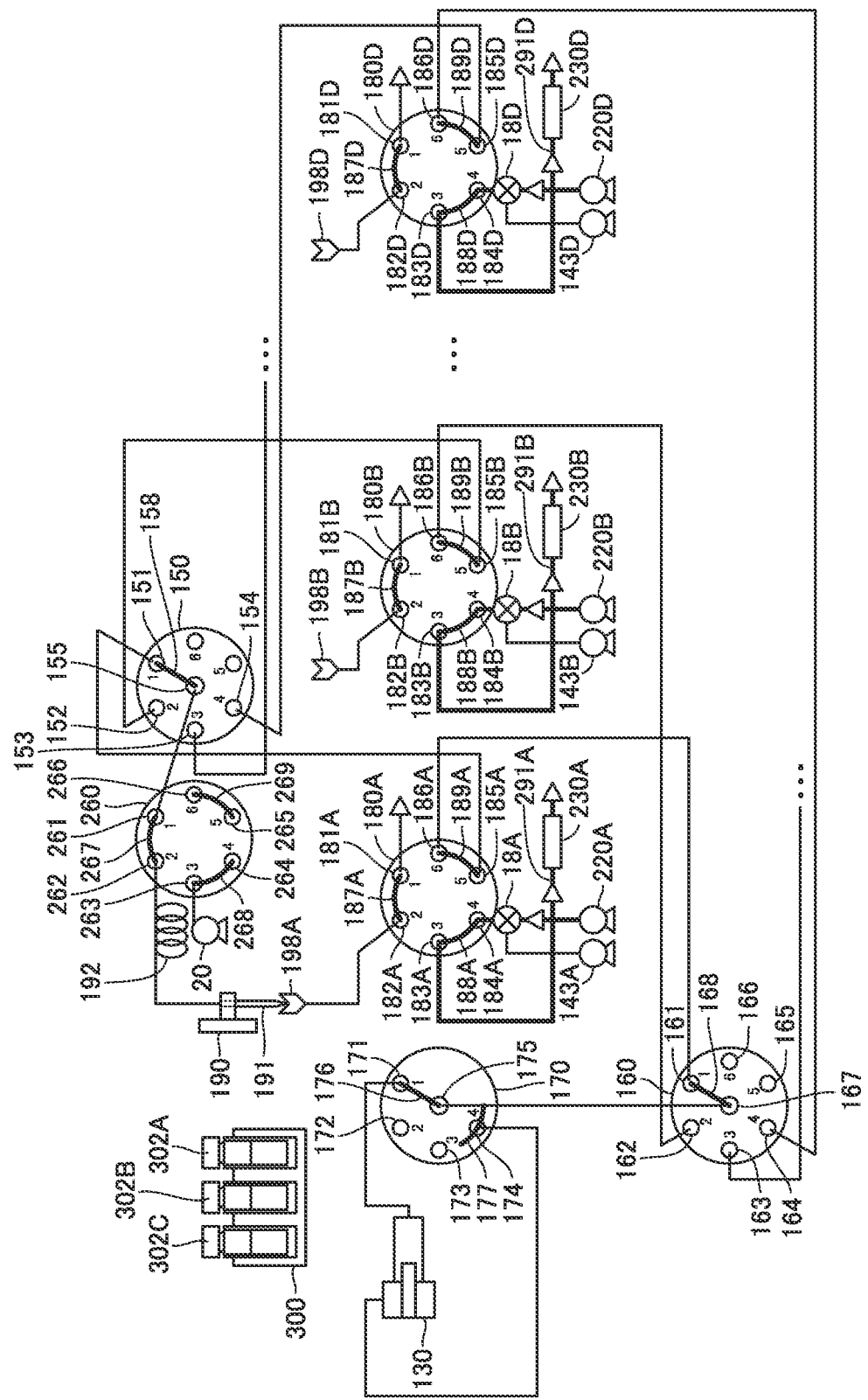
FIGS. 2 and 3 are diagrams each showing a construction of the liquid chromatographic system.
Figure 3:
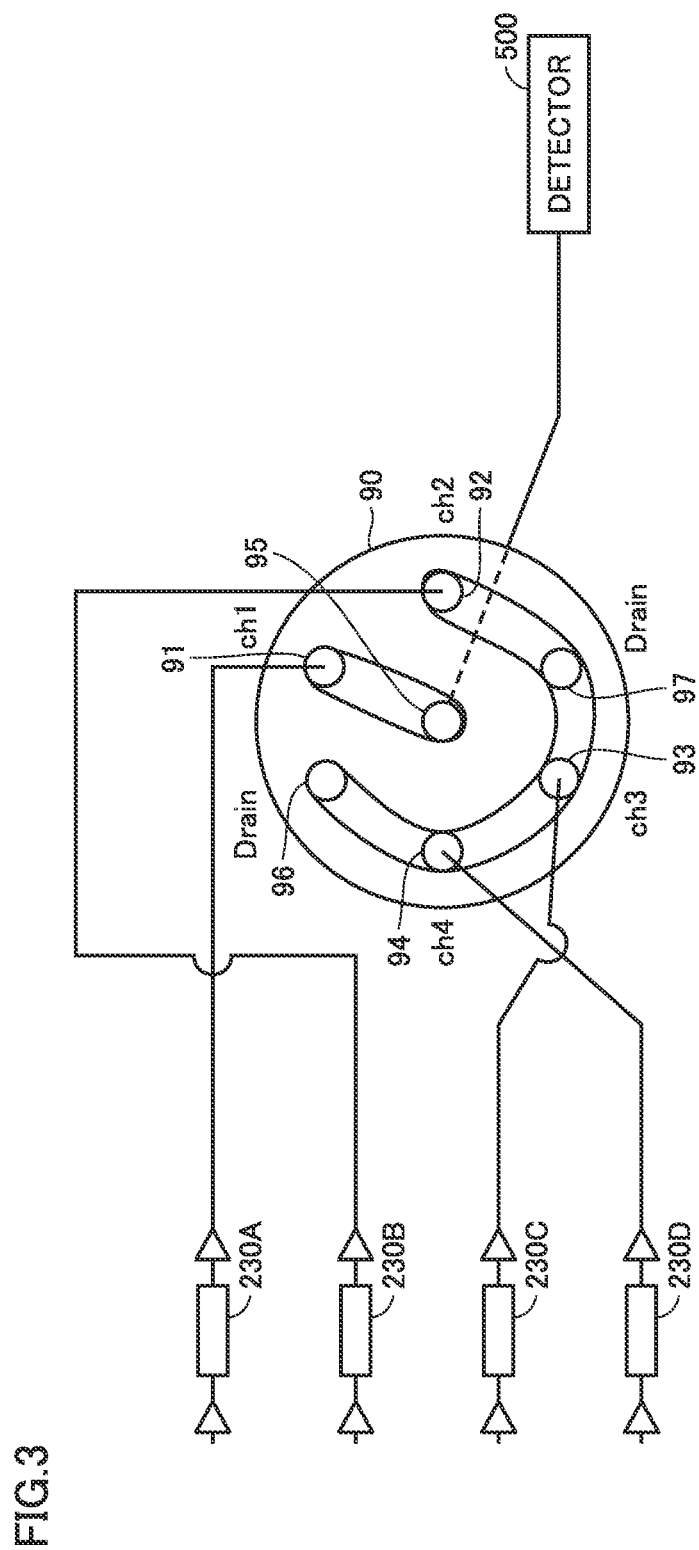

FIGS. 2 and 3 are diagrams each showing a construction of liquid chromatographic system 10. In particular, FIG. 3 shows a construction of diverter valve 90 included in liquid chromatographic system 10.

As described with reference to FIG. 1, liquid chromatographic system 10 includes four high-pressure valves 180A to 180D. FIG. 2 does not show features relating to high-pressure valve 180C among four high-pressure valves 180A to 180D shown in FIG. 1.

High-pressure valves 180A to 180D are connected to a first selector valve 150 and a second selector valve 160. First selector valve 150 and second selector valve 160 perform a function to select a high-pressure valve involved with suction and injection of a sample among high-pressure valves 180A to 180D. First selector valve 150 and second selector valve 160 are each implemented, for example, by a multi-way selector valve.

First selector valve 150 is connected to a needle valve 260. Needle valve 260 is connected to a needle 191 with a sample loop 192 being interposed. Needle 191 is a component like a syringe needle for sucking a sample. Sample loop 192 holds a sample sucked by needle 191. A needle moving mechanism 190 moves needle 191 in each of directions along three axes orthogonal to one another.

Liquid chromatographic system 10 includes injection ports 198A to 198D. Injection port 198A is provided in correspondence with high-pressure valve 180A. Injection port 198B is provided in correspondence with high-pressure valve 180B. Injection port 198C is provided in correspondence with high-pressure valve 180C. Injection port 198D is provided in correspondence with high-pressure valve 180D.

Containers 302A to 302C where samples are accommodated are placed on a sample carrier 300. Needle moving mechanism 190 moves needle 191 for suction of the sample from one of containers 302A to 302C. Needle moving mechanism 190 moves needle 191 for injection of the sucked sample into one of injection ports 198A to 198D.

A needle cleaning pump 20 is further connected to needle valve 260.

Second selector valve 160 is connected to a low-pressure valve 170. Low-pressure valve 170 is connected to a metering pump 130. Metering pump 130 is used for suction of a prescribed amount of sample by needle 191.

High-pressure valve 180A includes ports 181A to 186A. Port 181A is connected to a not-shown liquid discharge pipe. In other words, port 181A is a drain port. Port 182A is connected to injection port 198A. Port 183A is connected to column 230A. Port 184A is connected to high-pressure pump 220A and cleaning pump 143A with cleaning valve 18A being interposed. Port 185A is connected to first selector valve 150. Port 186A is connected to second selector valve 160.

High-pressure valve 180A includes connection portions 187A to 189A. Connection portions 187A to 189A switch a state of connection of ports 181A to 186A between a first state and a second state.

The first state is a state shown in FIG. 2. Specifically, the first state is a state in which port 181A and port 182A are connected to each other, port 183A and port 184A are connected to each other, and port 185A and port 186A are connected to each other.

In the first state, first selector valve 150 and second selector valve 160 are connected to each other with high-pressure valve 180A being interposed. In the first state, column 230A and high-pressure pump 220A or cleaning pump 143A are connected to each other with high-pressure valve 180A being interposed. In the first state, injection port 198A is connected to port 181A which is the drain port of high-pressure valve 180A.

The second state is a state resulting from turning of connection portions 187A to 189A shown in FIG. 1 by thirty degrees around the center of high-pressure valve 180A. Specifically, the second state is a state in which port 182A and port 183A are connected to each other, port 184A and port 185A are connected to each other, and port 186A and port 181A are connected to each other. The second state is shown, for example, in FIG. 6.

High-pressure valves 180B to 180D are similar in construction to high-pressure valve 180A. High-pressure valves 180B to 180D are each switched between the first state and the second state similarly to high-pressure valve 180A. Further description of high-pressure valves 180B to 180D is substantially repetition of the description of the construction of high-pressure valve 180A. Therefore, further description of high-pressure valves 180A to 180D will not be repeated.

First selector valve 150 includes ports 151 to 155. High-pressure valve 180A is connected to port 151. High-pressure valve 180B is connected to port 152. High-pressure valve 180C is connected to port 153. High-pressure valve 180D is connected to port 154. Needle valve 260 is connected to port 155.

First selector valve 150 includes a connection portion 158. Connection portion 158 switches an object to be connected to port 155 among ports 151 to 154.

Needle valve 260 includes ports 261 to 266 and connection portions 267 to 269. First selector valve 150 is connected to port 261. Sample loop 192 is connected to port 262. Needle cleaning pump 20 is connected to port 263.

Needle valve 260 switches a state of connection portions 267 to 269 between the state shown in FIG. 2 and a state resulting from turning of connection portions 267 to 269 by thirty degrees around the center of needle valve 260 from the state shown in FIG. 2.

In the state shown in FIG. 2, needle 191 is connected to needle valve 260 with sample loop 192 being interposed, needle valve 260 is connected to first selector valve 150, and first selector valve 150 is connected to high-pressure valve 180A. Furthermore, high-pressure valve 180A is connected to second selector valve 160, and second selector valve 160 is connected to metering pump 130 with low-pressure valve 170 being interposed. Therefore, as needle 191 is moved to any one of containers 302A to 302C and then metering pump 130 is driven, needle 191 sucks the sample.

As shown in FIG. 3, columns 230A to 230D are connected to diverter valve 90. FIG. 3 shows a state that port 95 formed at the center of diverter valve 90 and port 91 corresponding to column 230A are connected to each other. At this time, ports 92 to 94 of diverter valve 90 are connected to ports 96 and 97 which are drain ports of diverter valve 90.

In this state, the flow path including column 230A is connected to detector 500. Detector 500 can analyze the sample in column 230A. The flow path including column 230B leads to a not-shown liquid discharge pipe through ports 96 and 97 of diverter valve 90. The flow path including column 230C and the flow path including column 230D also similarly lead to the not-shown liquid discharge pipe through ports 96 and 97 of diverter valve 90.

As described above, liquid chromatographic system 10 includes a large number of valves. In relation with first selector valve 150 and second selector valve 160, diverter valve 90 can also be referred to as a third selector valve and needle valve 260 can also be referred to as a fourth selector valve.

<Block Diagram of Liquid Chromatographic System 10>

Figure 4:
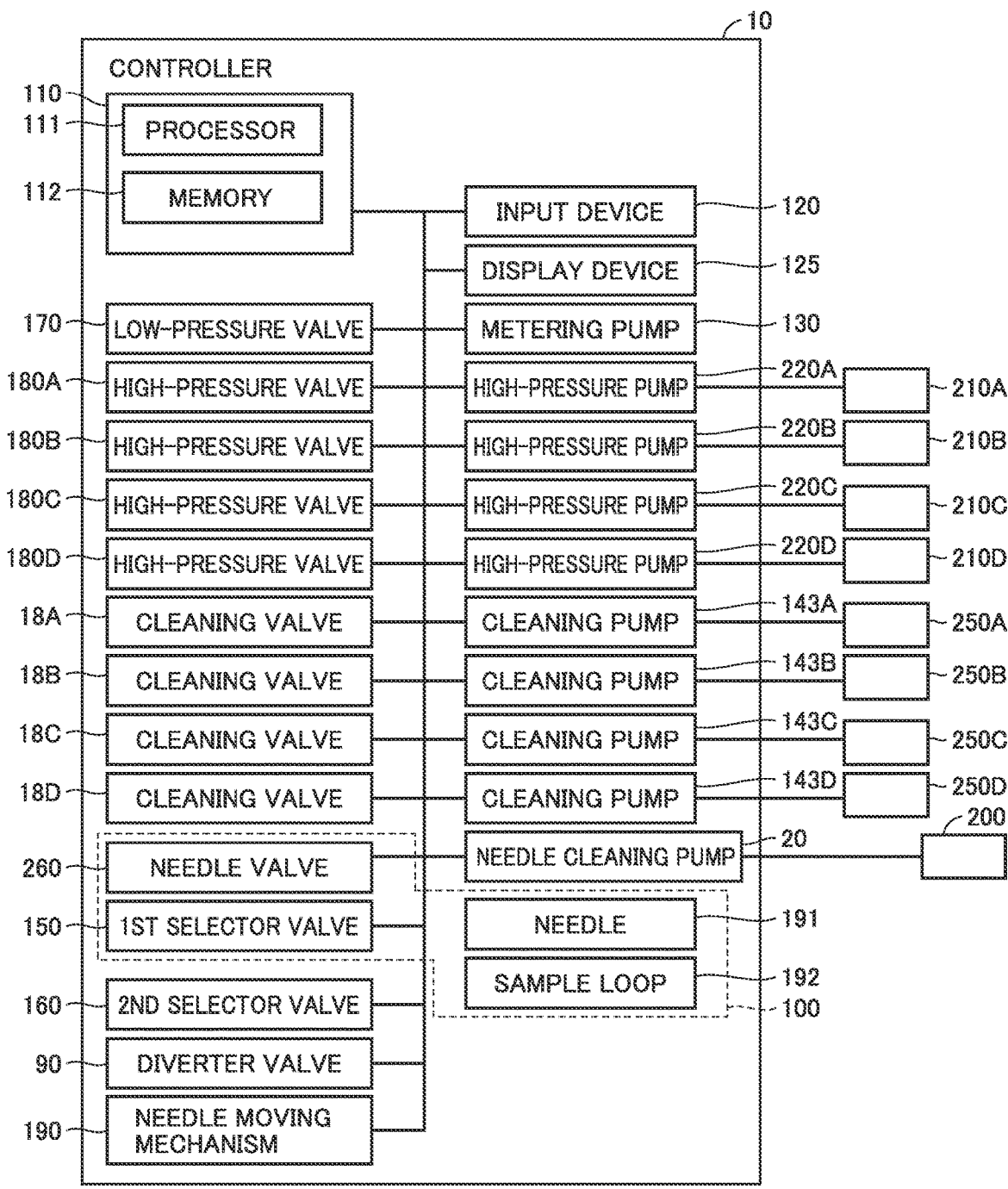
FIG. 4 is a block diagram showing the construction of the liquid chromatographic system.

FIG. 4 is a block diagram showing the construction of liquid chromatographic system 10. As described so far, liquid chromatographic system 10 includes a large number of valves and a large number of pumps.

The valves provided in liquid chromatographic system 10 include low-pressure valve 170, high-pressure valves 180A to 180D, cleaning valves 18A to 18D, needle valve 260, first selector valve 150, second selector valve 160, and diverter valve 90.

Since the specific construction of these valves has already been described with reference to FIGS. 1 to 3, description thereof will not be repeated.

The pumps provided in liquid chromatographic system 10 include high-pressure pumps 220A to 220D, cleaning pumps 143A to 143D, needle cleaning pump 20, and metering pump 130. High-pressure pumps 220A to 220D suck the eluent from containers 210A to 210D, respectively. Cleaning pumps 143A to 143D suck the rinse solution from containers 250A to 250D, respectively.

An identical eluent may be accommodated in containers 210A to 210D, or different types of eluents may be accommodated in containers 210A to 210D, respectively. An identical rinse solution may be accommodated in containers 250A to 250D, or different types of rinse solutions may be accommodated in containers 250A to 250D, respectively.

Needle cleaning pump 20 sucks the rinse solution from a container 200. A rinse solution identical to the rinse solution accommodated in containers 250A to 250D may be accommodated in container 200, or a rinse solution different in type from the rinse solution accommodated in containers 250A to 250D may be accommodated in container 200.

Sample injection device 100 includes first selector valve 150, needle valve 260, needle 191, and sample loop 192.

Liquid chromatographic system 10 further includes a controller 110, an input device 120, a display device 125, and needle moving mechanism 190. Since details of needle moving mechanism 190 have already been described with reference to FIG. 2, description thereof will not be repeated.

Controller 110 includes a processor 111 and a memory 112. Processor 111 is typically a computing processing unit such as a central processing unit (CPU) or a multi-processing unit (MPU). Processor 111 performs processing of liquid chromatographic system 10 by reading and executing a program stored in memory 112.

Memory 112 is implemented by a non-volatile memory such as a random access memory (RAM), a read only memory (ROM), and a flash memory. So long as a program can be recorded in a non-transitory manner in a format readable by processor 111, memory 112 may be implemented by a compact disc-read only memory (CD-ROM), a digital versatile disk-read only memory (DVD-ROM), a universal serial bus (USB) memory, a memory card, a flexible disk (FD), a hard disk, a solid state drive (SSD), a magnetic tape, a cassette tape, a magnetic optical disc (MO), a mini disc (MD), an integrated circuit (IC) card (except for a memory card), an optical card, a mask ROM, or an EPROM.

Input device 120 is implemented, for example, by a keyboard and a mouse. A user can input various instructions to controller 110 by operating input device 120. An image in accordance with a video signal outputted from controller 110 is shown on display device 125.

Setting information for each of first analysis flow path 291A to fourth analysis flow path 291D (see FIG. 1) provided in liquid chromatographic system 10 is shown on display device 125. The user can set a schedule for analysis with the use of first analysis flow path 291A to fourth analysis flow path 291D while the user looks at a screen on display device 125. Controller 110 conducts analysis based on the inputted schedule and has first analysis flow path 291A to fourth analysis flow path 291D cleaned.

<Suction of Sample>

Figure 5:
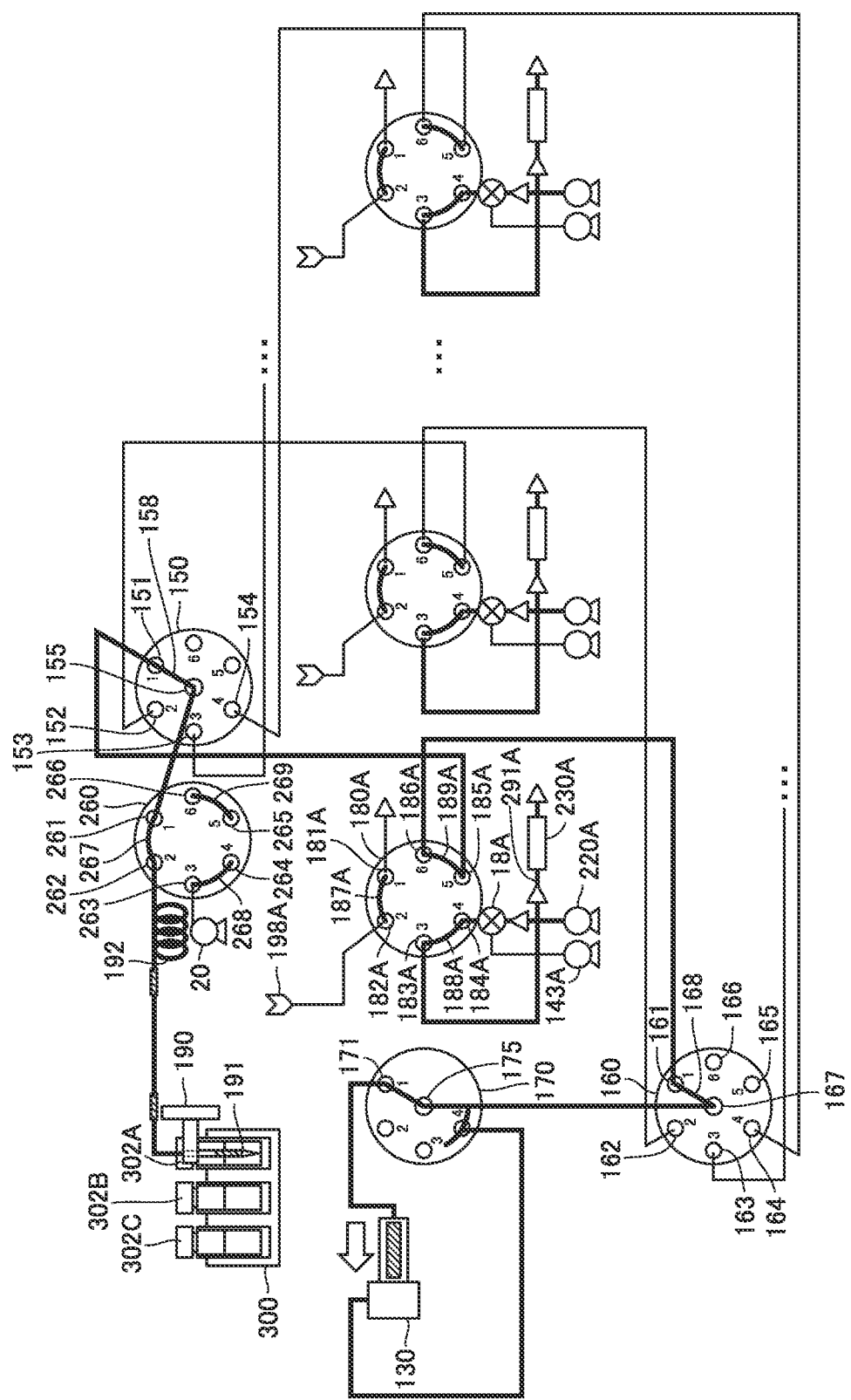
FIG. 5 is a diagram exemplifying a state of suction of a sample by a needle.

FIG. 5 is a diagram exemplifying a state of suction of a sample by needle 191. An example of suction of a sample to be injected into injection port 198A by needle 191 from container 302A will be described.

Injection port 198A corresponds to high-pressure valve 180A among high-pressure valves 180A to 180D. Therefore, first selector valve 150 and second selector valve 160 are connected to high-pressure valve 180A. As illustrated, first selector valve 150 is connected to needle 191 with needle valve 260 and sample loop 192 being interposed. Needle moving mechanism 190 guides needle 191 to container 302A. Second selector valve 160 is connected to metering pump 130 with low-pressure valve 170 being interposed.

Metering pump 130 applies a prescribed negative pressure to needle 191 with low-pressure valve 170, second selector valve 160, first selector valve 150, and needle valve 260 being interposed. Needle 191 thus sucks a prescribed amount of sample from container 302A. The sample sucked by needle 191 is held, for example, around sample loop 192.

FIG. 5 shows an example in which the sample is sucked via high-pressure valve 180A. As an object to which first selector valve 150 and second selector valve 160 are connected is switched among high-pressure valves 180B to 180D, the sample is sucked via corresponding one of high-pressure valves 180B to 180D.

First selector valve 150 and second selector valve 160 implement a switching device that switches a high-pressure valve through which the flow path leading from metering pump 130 to needle 191 passes, among high-pressure valves 180A to 180D.

<Injection of Sample>

Figure 6:
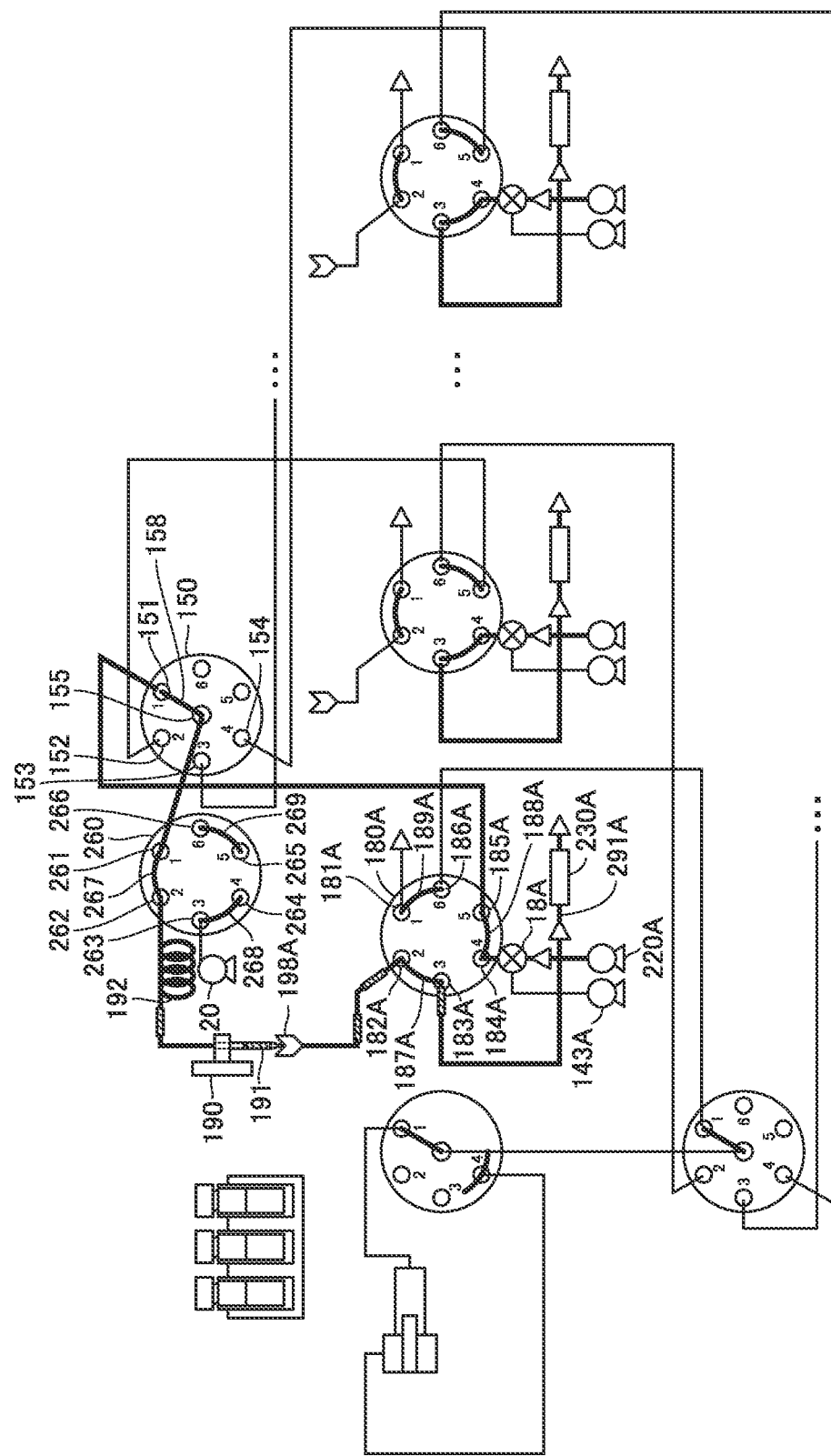
FIG. 6 is a diagram exemplifying a state of injection of the sample sucked by the needle into an injection port.

FIG. 6 is a diagram exemplifying a state of injection of the sample sucked by needle 191 into injection port 198A.

In injection of the sample into injection port 198A, connection portions 187A to 189A are turned by thirty degrees around the center of high-pressure valve 180A from the state shown in FIG. 5. High-pressure valve 180A and high-pressure pump 220A are connected to each other through cleaning valve 18A. Needle moving mechanism 190 moves needle 191 to injection port 198A.

Consequently, the flow path from high-pressure pump 220A via high-pressure valve 180A, first selector valve 150, needle 191, injection port 198A, and high-pressure valve 180A to column 230A is formed. This flow path corresponds to the first flow path that passes through sample injection device 100 in first analysis flow path 291A as described with reference to FIG. 1. At this time, column 230A is connected to detector 500 with diverter valve 90 being interposed. FIG. 6 does not show a state of connection between column 230A and diverter valve 90. The state of connection is as shown, for example, in FIG. 3.

As high-pressure pump 220A is driven while the flow path is formed as above, the eluent is supplied to high-pressure valve 180A. The eluent supplied to high-pressure valve 180A flows in a direction toward needle 191 via first selector valve 150 and the like. The sample held around sample loop 192 is thus injected together with the eluent from a tip end of needle 191 into injection port 198A. The injected sample flows to column 230A together with the eluent.

FIG. 6 shows an example in which the sample is injected into injection port 198A corresponding to high-pressure valve 180A. As an object to which first selector valve 150 is connected is switched among high-pressure valves 180B to 180D, the sample is injected into corresponding one of injection ports 198B to 198D corresponding to respective high-pressure valves 180B to 180D.

<Injection of Eluent>

Figure 7:
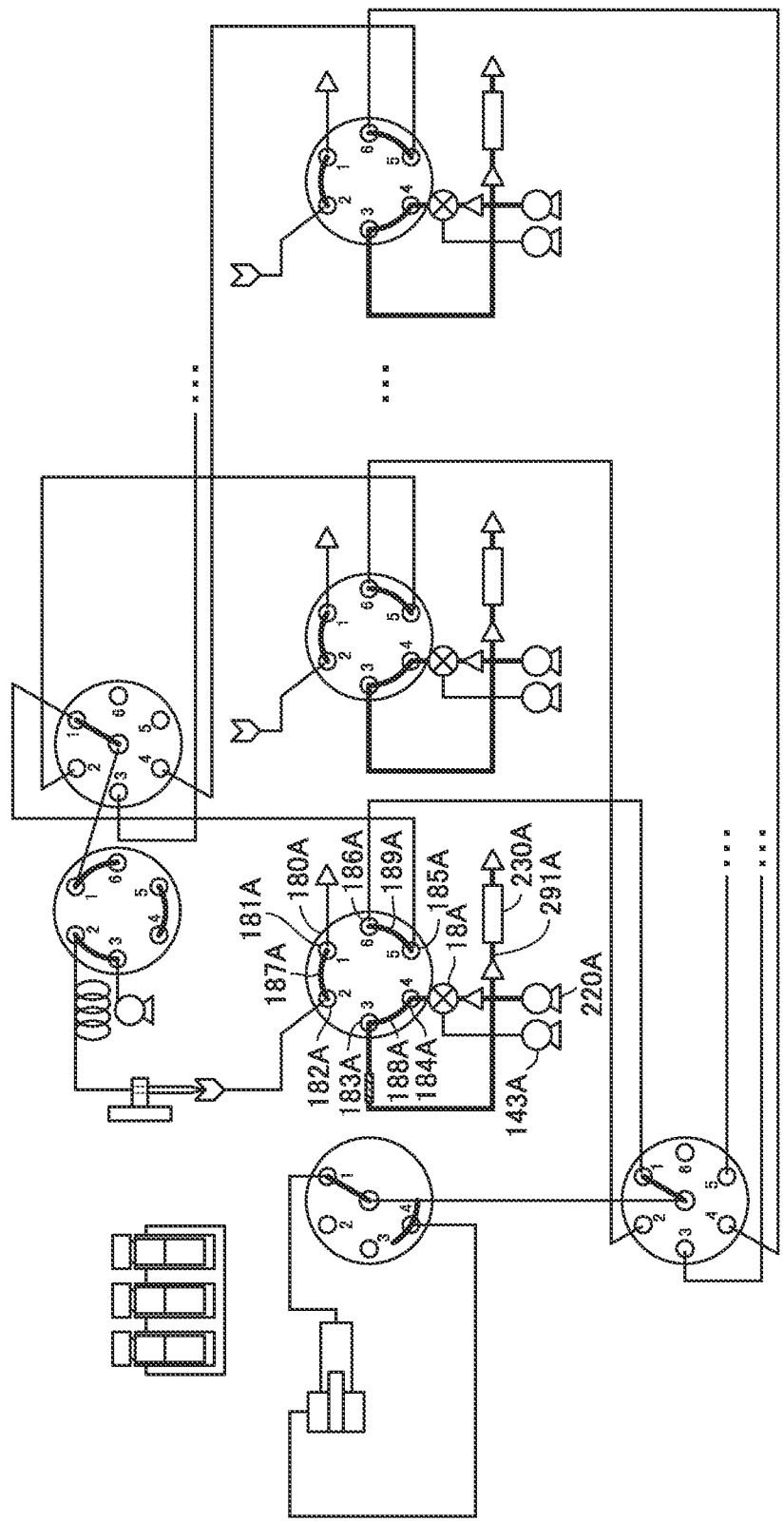
FIG. 7 is a diagram exemplifying a state of injection of an eluent into a column after the sample is guided to the column.

FIG. 7 is a diagram exemplifying a state of injection of an eluent into column 230A after the sample is guided to column 230A.

After the sample is guided to column 230A, connection portions 187A to 189A are turned by thirty degrees around the center of high-pressure valve 180A from the state shown in FIG. 6. High-pressure pump 220A is thus connected to column 230A through port 184A and port 183A of high-pressure valve 180A.

This flow path corresponds to the second flow path that does not pass through sample injection device 100 in first analysis flow path 291A as described with reference to FIG. 1. At this time, column 230A is connected to detector 500 with diverter valve 90 being interposed. The state of connection is as shown, for example, in FIG. 3. As the eluent is supplied from high-pressure pump 220A to high-pressure valve 180A, the sample is separated in column 230A.

At this time, injection port 198A is connected to port 181A which is the drain port of high-pressure valve 180A. Furthermore, connection portions 267 to 269 of needle valve 260 are turned by thirty degrees around the center of needle valve 260 from the state shown in FIG. 6. Consequently, needle cleaning pump 20 is connected to needle 191 with needle valve 260 and sample loop 192 being interposed.

FIG. 7 shows an example in which the eluent is injected into column 230A. As high-pressure pumps 220B to 220D corresponding to respective high-pressure valves 180B to 180D are driven, the eluent is similarly injected into respective columns 230B to 230D.

<Switching of Analysis Flow Path>

Figure 8:
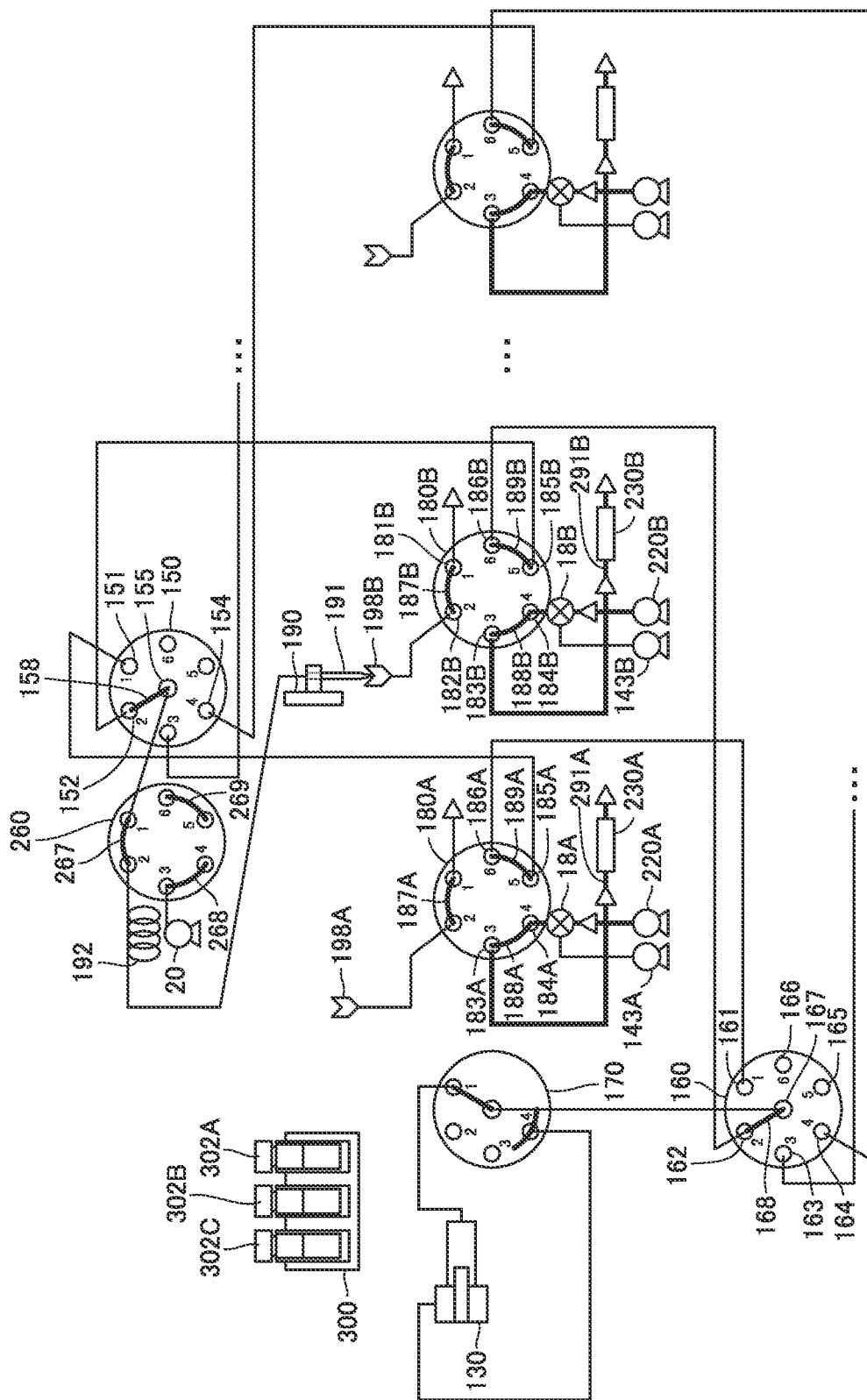
FIG. 8 is a diagram exemplifying a state of switching of a stream to be used for analysis from a first stream to a second stream.

FIG. 8 is a diagram exemplifying a state of switching of a flow path to be used for analysis of a sample from first analysis flow path 291A to second analysis flow path 291B. The concept of first analysis flow path 291A and second analysis flow path 291B is as described with reference to FIG. 1.

When the flow path to be used for analysis of the sample is switched from first analysis flow path 291A to second analysis flow path 291B, the state of first selector valve 150 and second selector valve 160 changes. Specifically, connection portion 158 of first selector valve 150 switches an object to which port 155 is connected from port 151 to port 152. Connection portion 168 of second selector valve 160 switches an object to which port 167 is connected from port 161 to port 162.

First selector valve 150 and second selector valve 160 are thus connected to high-pressure valve 180B. As illustrated, first selector valve 150 is connected to needle 191 with needle valve 260 and sample loop 192 being interposed. Second selector valve 160 is connected to metering pump 130 with low-pressure valve 170 being interposed.

For example, after needle 191 is moved to any one of containers 302A to 302C where the samples are accommodated, controller 110 has metering pump 130 driven. The sample can thus be sucked by needle 191 via high-pressure valve 180B. Injection port 198B corresponds to high-pressure valve 180B among high-pressure valves 180A to 180D. Therefore, by injection of the sample sucked by needle 191 into injection port 198B, the sample can be guided to column 230B corresponding to second analysis flow path 291B.

<Construction in Comparative Example>

Figure 9:
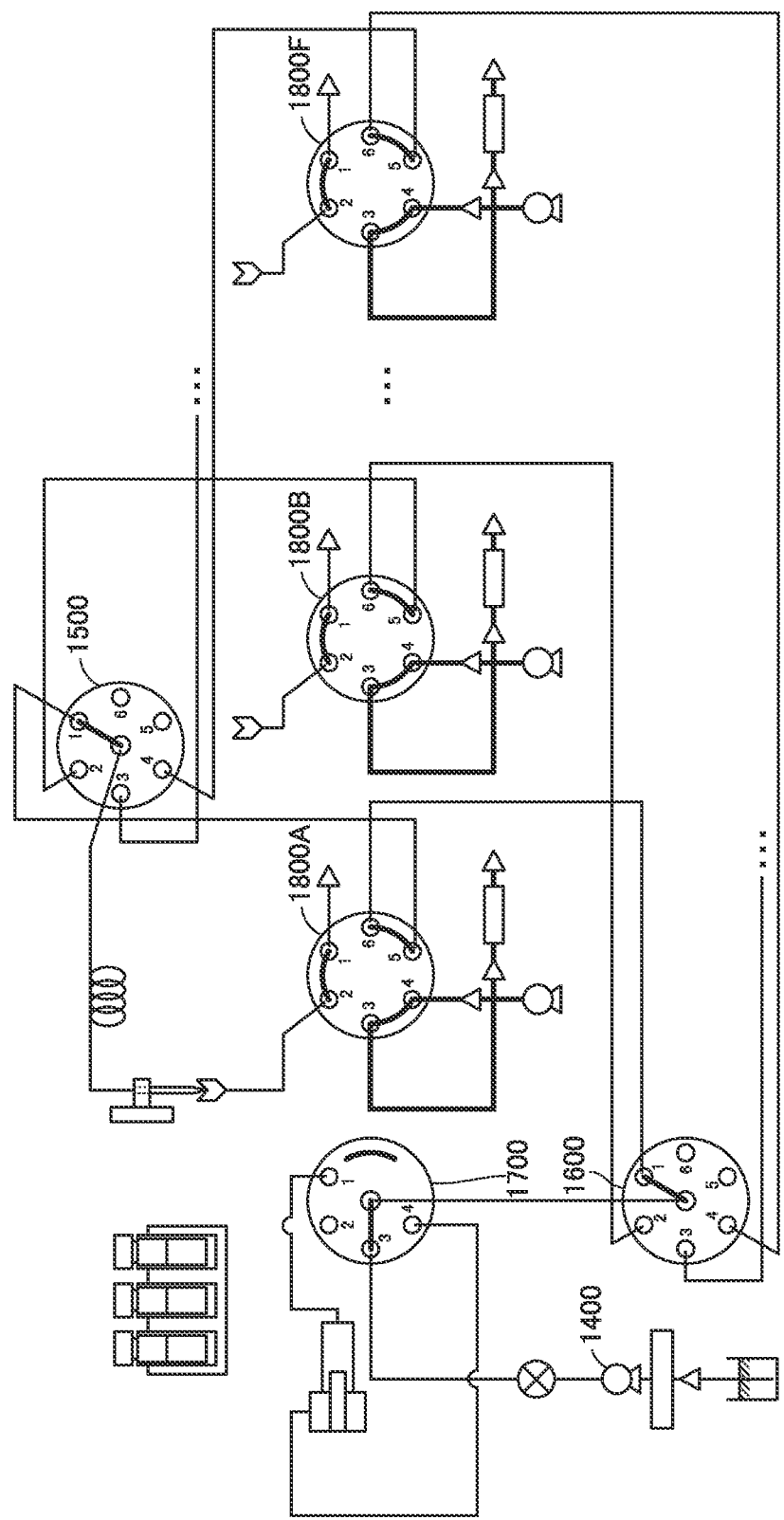
FIG. 9 is a diagram showing a comparative example of the liquid chromatographic system according to the present embodiment.

FIG. 9 is a diagram showing a comparative example of liquid chromatographic system 10 according to the present embodiment. The comparative example includes a plurality of high-pressure valves 1800A to 1800F, a first selector valve 1500, a second selector valve 1600, and a low-pressure valve 1700.

First selector valve 1500 and second selector valve 1600 are in coordination, and connected to any one of high-pressure valves 1800A to 1800F. Low-pressure valve 1700 is connected to any one of high-pressure valves 1800A to 1800F with second selector valve 1600 being interposed.

In the comparative example, a cleaning pump corresponding to each of high-pressure valves 1800A to 1800F is not provided, but a cleaning pump 1400 corresponding to low-pressure valve 1700 is provided. As cleaning pump 1400 is driven, the rinse solution is supplied to second selector valve 1600 via low-pressure valve 1700. In the comparative example, as cleaning pump 1400 is driven while first selector valve 1500 and second selector valve 1600 are connected to high-pressure valve 1800A, a flow path including high-pressure valve 1800A can be cleaned.

A flow path including high-pressure valve 1800B, however, cannot be cleaned while first selector valve 1500 and second selector valve 1600 are connected to high-pressure valve 1800A. Similarly, flow paths including respective high-pressure valves 1800C to 1800F cannot be cleaned while first selector valve 1500 and second selector valve 1600 are connected to high-pressure valve 1800A.

While first selector valve 1500 and second selector valve 1600 are connected to high-pressure valve 1800A, a sample may be being analyzed through the flow path including high-pressure valve 1800A. At this time, the flow paths including respective high-pressure valves 1800B to 1800F are not being used for analysis of the sample. In the comparative example, however, an object to which the rinse solution from cleaning pump 1400 is supplied is limited to an object to which second selector valve 1600 is connected. Therefore, in the comparative example, while second selector valve 1600 is connected to high-pressure valve 1800A, flow paths including respective high-pressure valves 1800B to 1800F cannot be cleaned.

In contrast, liquid chromatographic system 10 according to the present embodiment includes cleaning pumps 143A to 143D corresponding to respective high-pressure valves 180A to 180D. Therefore, according to liquid chromatographic system 10, the flow paths including respective high-pressure valves 180A to 180D can be cleaned with the rinse solution without liquid chromatographic system 10 being affected by to which of high-pressure valves 180A to 180D second selector valve 160 is connected.

<Overview of First Cleaning Pattern to Fifth Cleaning Pattern>

Figure 10:
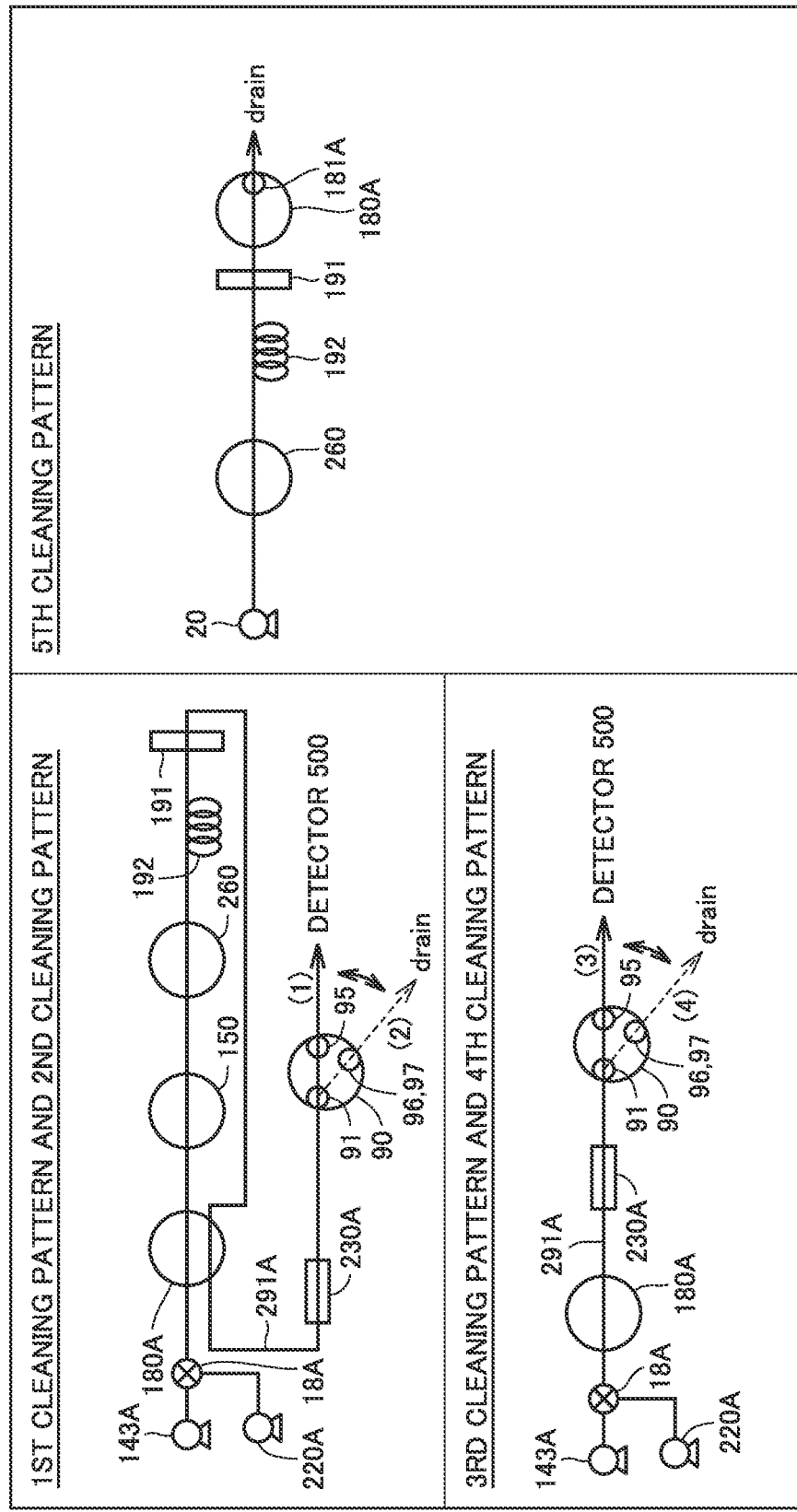
FIG. 10 is a diagram for illustrating overview of a first cleaning pattern to a fifth cleaning pattern.

FIG. 10 is a diagram for illustrating overview of a first cleaning pattern to a fifth cleaning pattern. A cleaning pattern is described with reference to FIG. 10, with a flow path including high-pressure valve 180A being focused on. Liquid chromatographic system 10 can clean the flow path including high-pressure valve 180A in the first cleaning pattern to the fifth cleaning pattern shown in FIG. 10.

In the first cleaning pattern and the second cleaning pattern, the flow path including high-pressure valve 180A is set as in an upper left frame. A solid arrow in diverter valve 90 represents a flow path set as the first cleaning pattern and a dashed arrow in diverter valve 90 represents a flow path set as the second cleaning pattern.

In the first cleaning pattern and the second cleaning pattern, the rinse solution supplied from cleaning pump 143A to high-pressure valve 180A flows sequentially through high-pressure valve 180A, first selector valve 150, needle valve 260, sample loop 192, needle 191, high-pressure valve 180A, column 230A, and diverter valve 90.

The flow path for cleaning set as the first cleaning pattern and the second cleaning pattern corresponds to the first flow path that passes through needle valve 260, sample loop 192, and needle 191. The first flow path represents, for example, one form of first analysis flow path 291A.

In the first cleaning pattern, port 91 and port 95 of diverter valve 90 are connected to each other, and hence the rinse solution that flows into diverter valve 90 flows through ports 91 and 95 and cleans the ports inclusive of the flow path leading from diverter valve 90 to detector 500. In the second cleaning pattern, port 91 and ports 96 and 97 of diverter valve 90 are connected to each other, and hence the rinse solution that flows into diverter valve 90 cleans port 91 and is discharged from ports 96 and 97.

In the third cleaning pattern and the fourth cleaning pattern, the flow path including high-pressure valve 180A is set as shown in a lower left frame. A solid arrow in diverter valve 90 represents the flow path set as the third cleaning pattern and a dashed arrow in diverter valve 90 represents the flow path set as the fourth cleaning pattern.

In the third cleaning pattern and the fourth cleaning pattern, the rinse solution supplied from cleaning pump 143A to high-pressure valve 180A flows sequentially through high-pressure valve 180A, column 230A, and diverter valve 90.

The flow path for cleaning set as the third cleaning pattern and the fourth cleaning pattern corresponds to the second flow path that does not pass through needle valve 260, sample loop 192, and needle 191. The second flow path represents, for example, one form of first analysis flow path 291A.

In the third cleaning pattern, port 91 and port 95 of diverter valve 90 are connected to each other, and hence the rinse solution that flows into diverter valve 90 flows through ports 91 and 95 and cleans the ports inclusive of the flow path leading from diverter valve 90 to detector 500. In the fourth cleaning pattern, port 91 and ports 96 and 97 of diverter valve 90 are connected to each other, and hence the rinse solution that flows into diverter valve 90 cleans port 91 and is discharged from ports 96 and 97.

In the fifth cleaning pattern, the flow path including high-pressure valve 180A is set as shown in a right frame. In the fifth cleaning pattern, the rinse solution supplied from needle cleaning pump 20 to needle valve 260 flows sequentially through needle valve 260, sample loop 192, needle 191, and high-pressure valve 180A. The rinse solution that has flowed into high-pressure valve 180A is discharged from port 181A of high-pressure valve 180A.

A specific construction of the first to fifth cleaning patterns will now be described. The construction of the flow path including high-pressure valve 180A will representatively be described below.

<First Cleaning Pattern and Second Cleaning Pattern>

Figure 11:
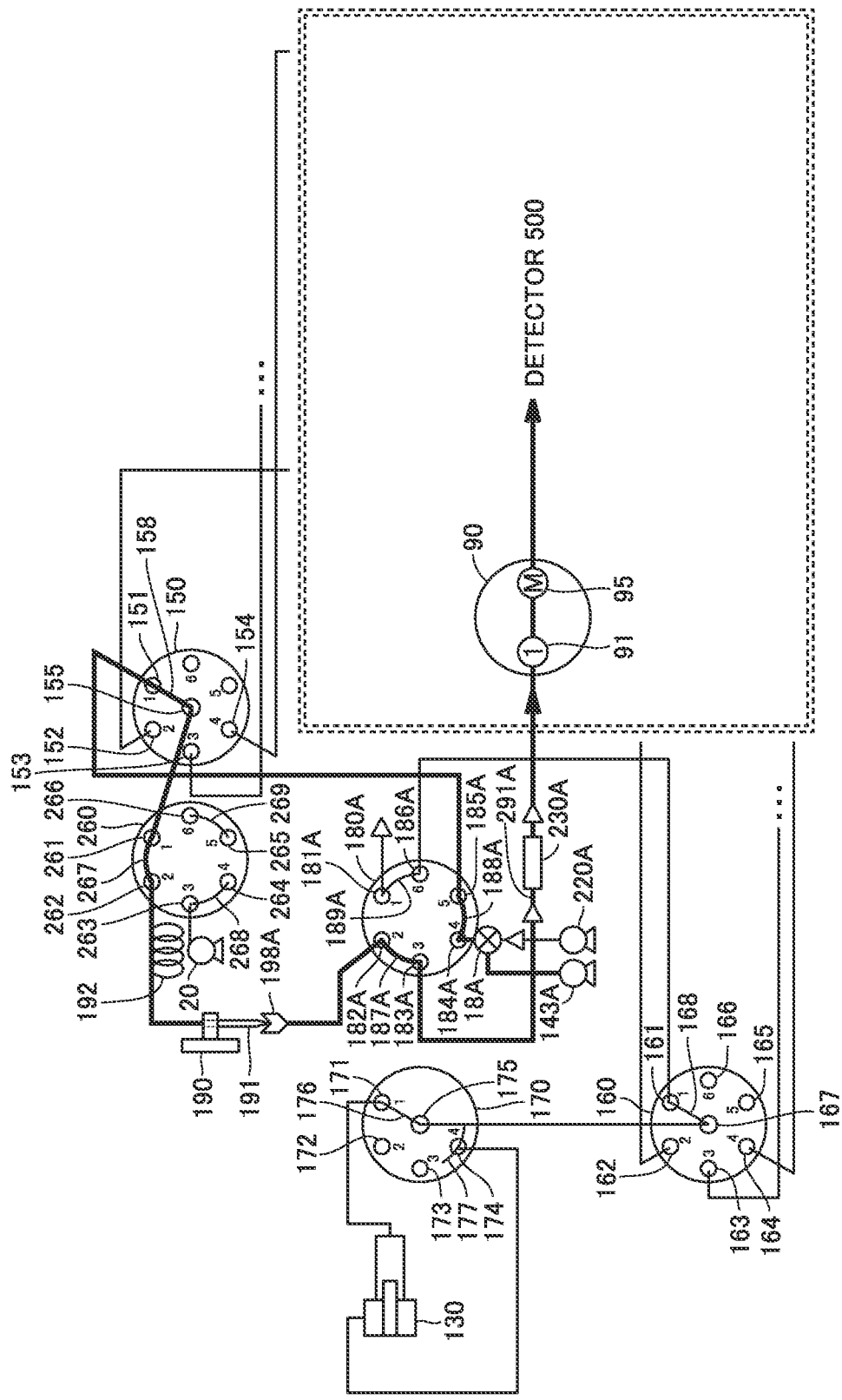
FIG. 11 is a diagram showing a specific exemplary construction of the first cleaning pattern.
Figure 12:
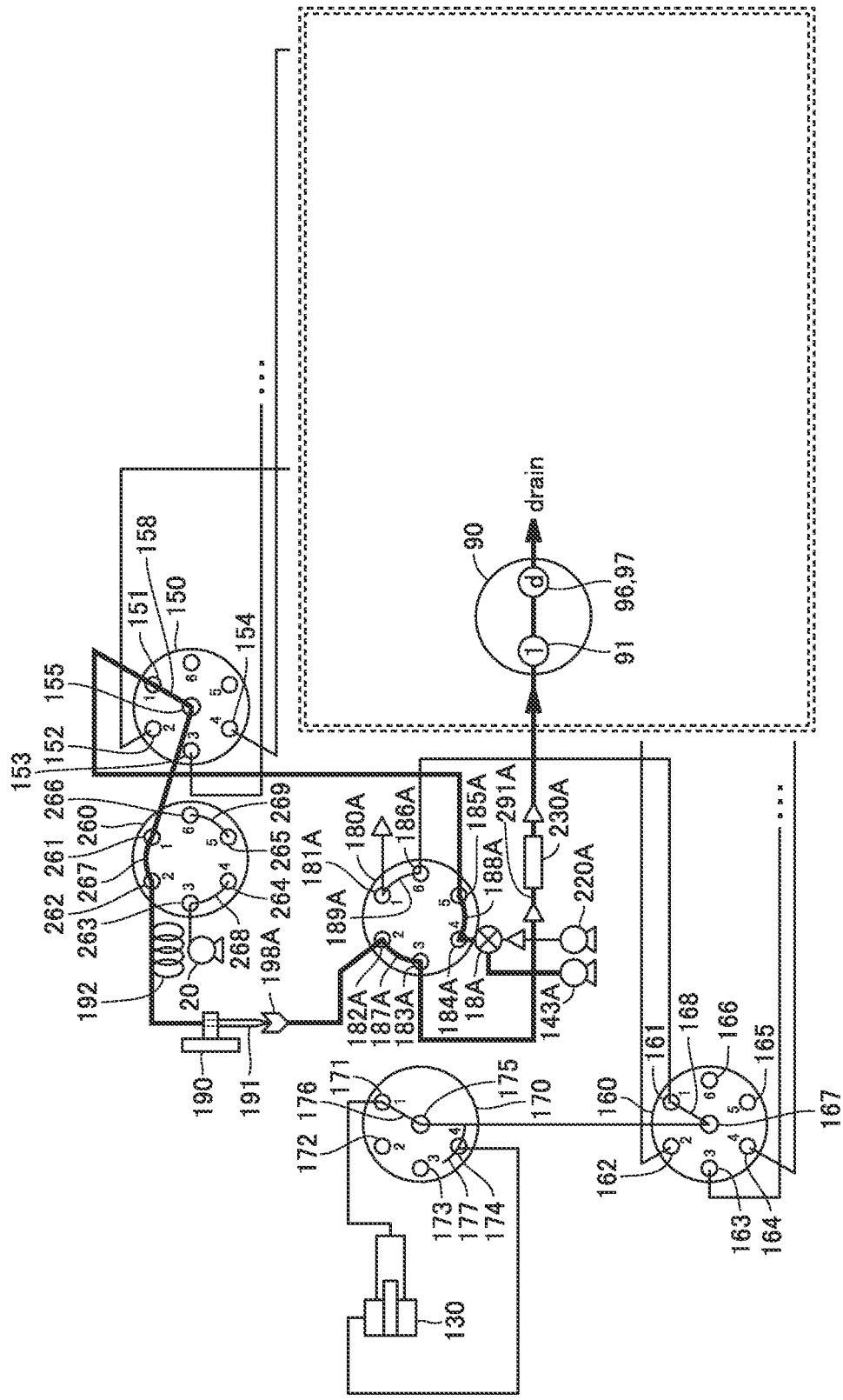
FIG. 12 is a diagram showing a specific exemplary construction of the second cleaning pattern.

FIG. 11 is a diagram showing a specific exemplary construction of the first cleaning pattern. FIG. 12 is a diagram showing a specific exemplary construction of the second cleaning pattern. FIGS. 11 and 12 do not show some of features and shows features involved with diverter valve 90 as being surrounded with a frame, which is also applicable to FIGS. 13 to 19.

In the first cleaning pattern, for example, a flow path shown in FIG. 11 is set. Specifically, port 151 and port 155 of first selector valve 150 are connected to each other. Needle 191 is connected to injection port 198A. In high-pressure valve 180A, port 182A and port 183A are connected to each other, port 184A and port 185A are connected to each other, and port 186A and port 181A are connected to each other. In diverter valve 90, port 91 and port 95 are connected to each other.

As the rinse solution is supplied from cleaning pump 143A to high-pressure valve 180A, the flow path including high-pressure valve 180A, first selector valve 150, needle valve 260, sample loop 192, needle 191, injection port 198A, high-pressure valve 180A, column 230A, and diverter valve 90 is cleaned with the rinse solution. Furthermore, the flow path leading to detector 500 is cleaned with the rinse solution. At this time, a container for a blank sample such as the rinse solution or the eluent may be prepared at sample carrier 300, the blank sample may be sucked by needle 191, and cleaning in the first cleaning pattern may be performed.

In the second cleaning pattern, for example, a flow path shown in FIG. 12 is set. The second cleaning pattern is different from the first cleaning pattern in setting of the flow path in diverter valve 90. Specifically, in the second cleaning pattern, port 91 and ports 96 and 97 of diverter valve 90 are connected to each other. Therefore, in the second cleaning pattern, the flow path leading from port 91 to ports 96 and 97 of diverter valve 90 is cleaned. At this time, a container for a blank sample such as the rinse solution or the eluent may be prepared at sample carrier 300, the blank sample may be sucked by needle 191, and cleaning in the second cleaning pattern may be performed.

<Third Cleaning Pattern and Fourth Cleaning Pattern>

Figure 13:
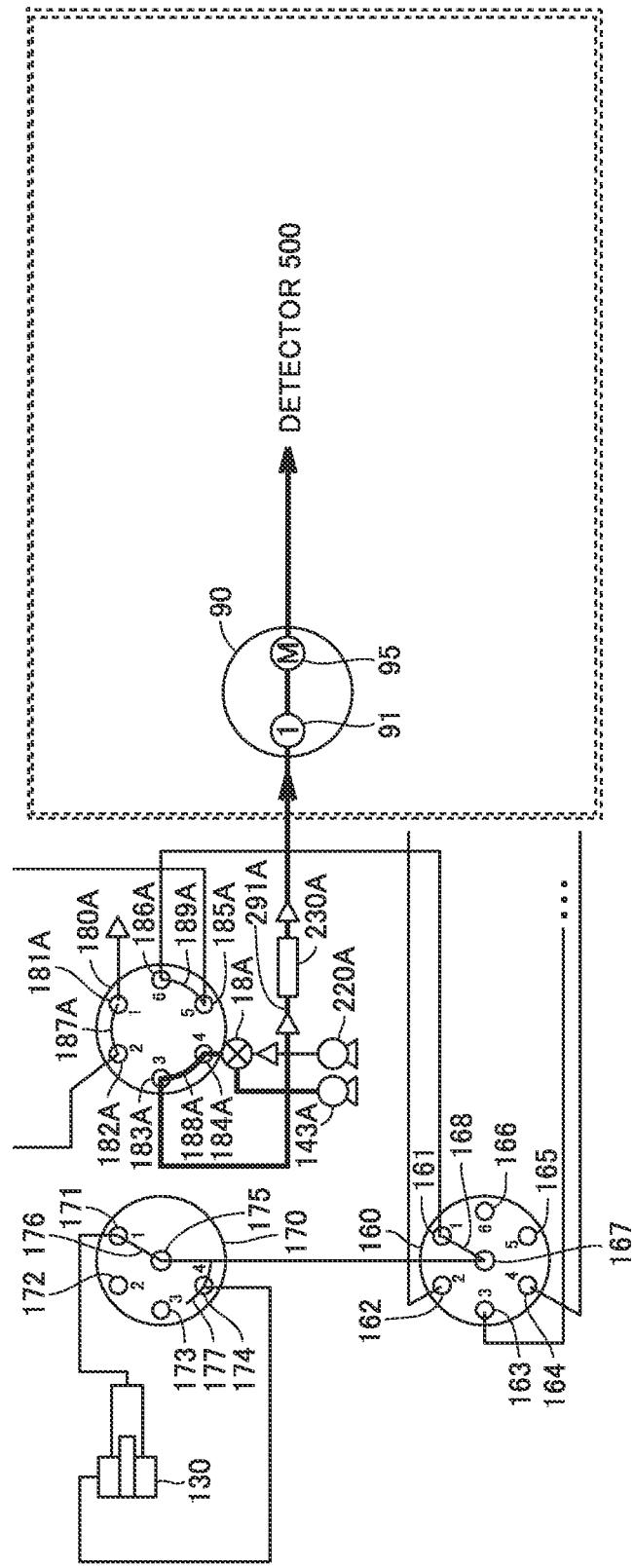
FIG. 13 is a diagram showing a specific exemplary construction of the third cleaning pattern.
Figure 14:
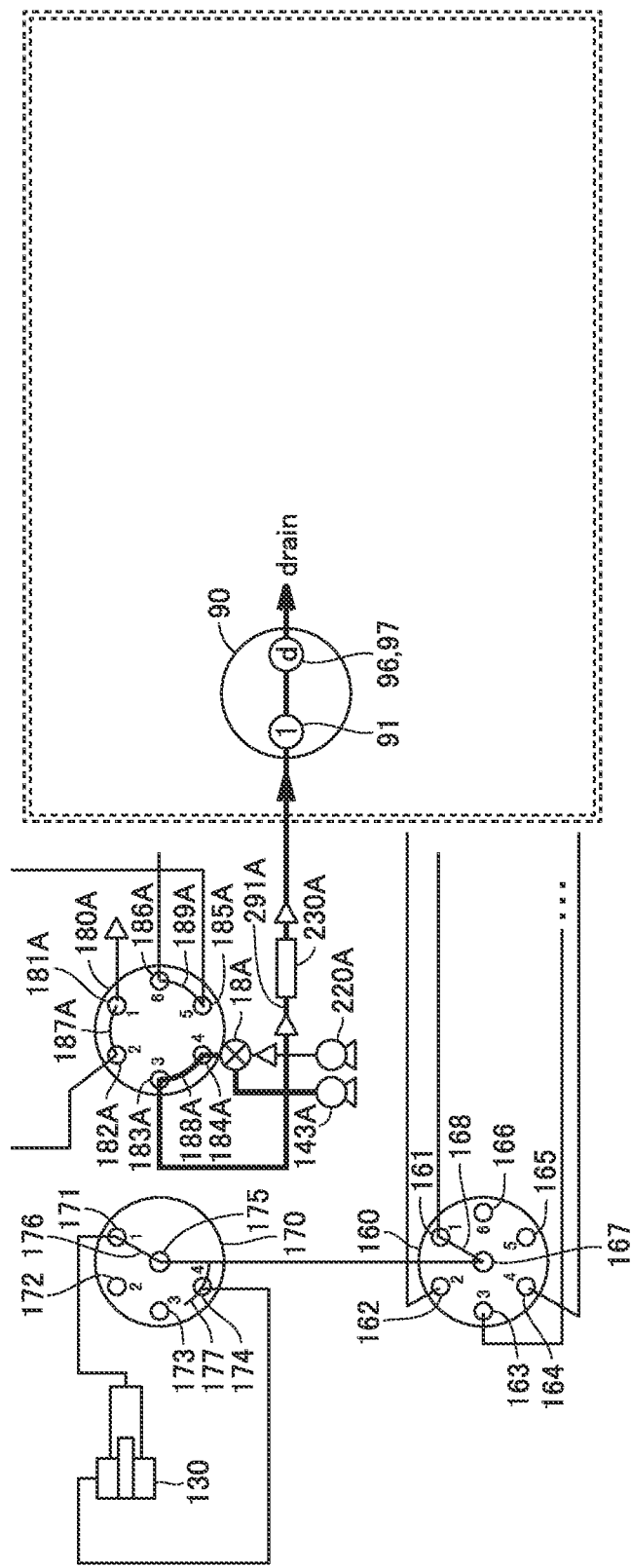
FIG. 14 is a diagram showing a specific exemplary construction of the fourth cleaning pattern.

FIG. 13 is a diagram showing a specific exemplary construction of the third cleaning pattern. FIG. 14 is a diagram showing a specific exemplary construction of the fourth cleaning pattern.

In the third cleaning pattern, for example, a flow path shown in FIG. 13 is set. Specifically, port 181A and port 182A of high-pressure valve 180A are connected to each other, port 183A and port 184A are connected to each other, and port 185A and port 186A are connected to each other. In diverter valve 90, port 91 and port 95 are connected to each other.

The rinse solution supplied from cleaning pump 143A to high-pressure valve 180A flows to column 230A without flowing to needle 191. Consequently, diverter valve 90 and the flow path leading from diverter valve 90 to detector 500 are cleaned with the rinse solution.

In the fourth cleaning pattern, for example, a flow path shown in FIG. 14 is set. The fourth cleaning pattern is different from the third cleaning pattern in setting of the flow path in diverter valve 90. Specifically, in the fourth cleaning pattern, port 91 and ports 96 and 97 of diverter valve 90 are connected to each other. Therefore, in the fourth cleaning pattern, the flow path leading from port 91 to ports 96 and 97 of diverter valve 90 is cleaned.

<Fifth Cleaning Pattern>

Figure 15:
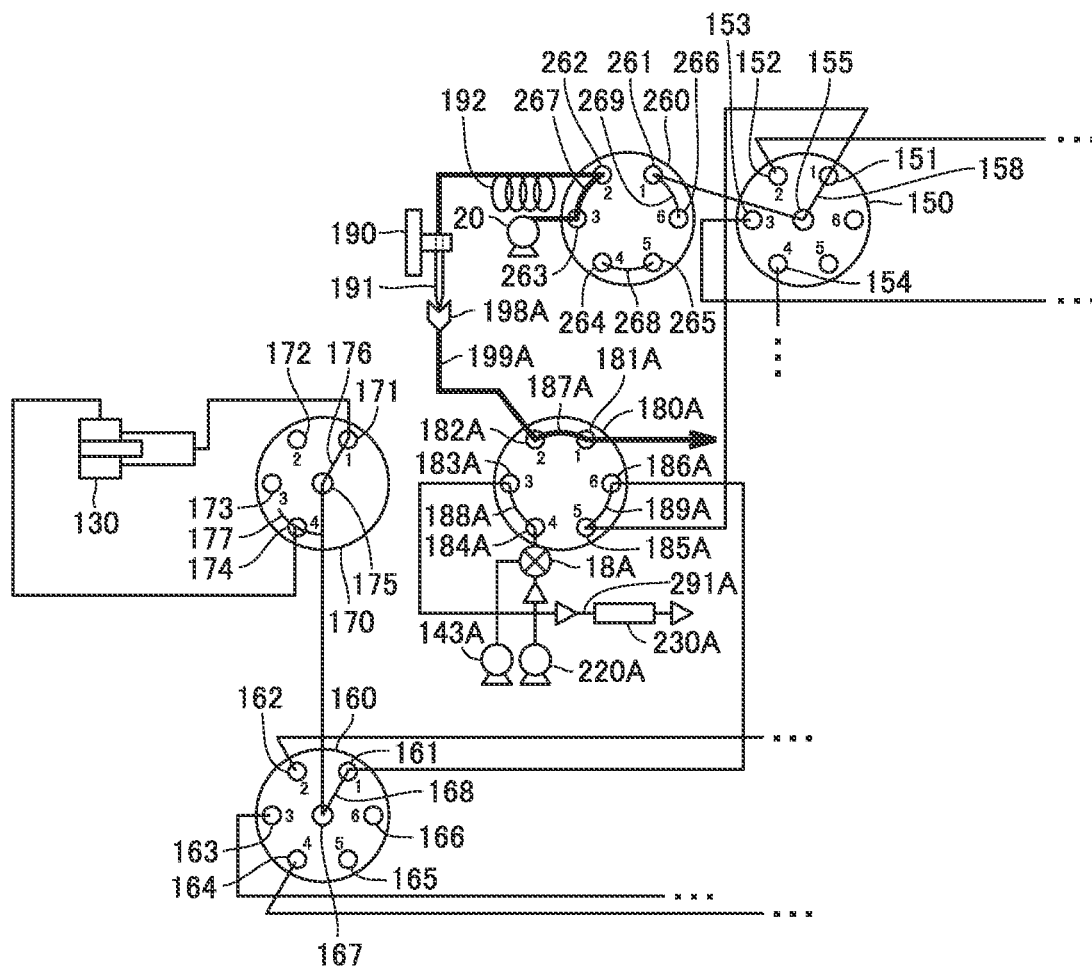
FIG. 15 is a diagram showing a specific exemplary construction of the fifth cleaning pattern.

FIG. 15 is a diagram showing a specific exemplary construction of the fifth cleaning pattern.

In the fifth cleaning pattern, for example, a flow path shown in FIG. 15 is set. Specifically, port 262 and port 263 of needle valve 260 are connected to each other, port 264 and port 265 are connected to each other, and port 266 and port 261 are connected to each other. Port 181A and port 182A of high-pressure valve 180A are connected to each other, port 183A and port 184A are connected to each other, and port 185A and port 186A are connected to each other.

As the rinse solution is supplied from needle cleaning pump 20 to needle valve 260, the flow path including sample loop 192, needle 191, injection port 198A, and high-pressure valve 180A is cleaned with the rinse solution. At this time, a container for a blank sample such as the rinse solution or the eluent may be prepared at sample carrier 300, the blank sample may be sucked by needle 191, and cleaning in the fifth cleaning pattern may be performed.

As described above, according to the first cleaning pattern and the second cleaning pattern, not only the flow path from column 230A to diverter valve 90 but also the flow path including needle 191 and sample loop 192 can be cleaned.

The third cleaning pattern and the fourth cleaning pattern are smaller in range of cleaning than the first cleaning pattern and the second cleaning pattern. Not including needle 191 and sample loop 192 in the third cleaning pattern and the fourth cleaning pattern, however, produces an effect of increase in variation of the cleaning method. Specifically, by making use of the third cleaning pattern and the fourth cleaning pattern, the flow path can be cleaned at timing of suction of the sample into needle 191 and sample loop 192.

According to the first cleaning pattern and the third cleaning pattern, the flow path leading to detector 500, inclusive of port 95 of diverter valve 90, can be cleaned. Such a cleaning pattern is effective, for example, in an example in which a sample at a high concentration is analyzed or in a construction in which analysis can continue with switching among a plurality of analysis flow paths (first analysis flow path 291A to fourth analysis flow path 291D) being made as in liquid chromatographic system 10 according to the present embodiment.

When analysis continues with switching among a plurality of analysis flow paths being made, a component in the sample may be accumulated in diverter valve 90 that switches among the analysis flow paths. In particular, the component in the sample may repeatedly be accumulated at port 95 in diverter valve 90 to which detector 500 is connected and carryover may occur. Alternatively, since the sample is continuously sent to an interface portion of detector 500 through diverter valve 90, carryover may occur in that interface portion.

According to the first cleaning pattern and the third cleaning pattern, port 95 of diverter valve 90, inclusive of the interface portion of detector 500, can be cleaned. Therefore, while efficient analysis through a plurality of analysis flow paths is conducted, a portion which will be a factor for occurrence of carryover can sufficiently be cleaned.

An example in which the flow path is cleaned with the rinse solution is described with reference to FIGS. 10 to 15. In the first to fifth cleaning patterns, however, the flow path may be cleaned with the eluent (blank solution). For example, with the use of high-pressure pump 220A instead of cleaning pump 143A in the first to fourth cleaning patterns, cleaning with the eluent may be performed. In the fifth cleaning pattern, by connection of needle cleaning pump 20 to the container where the eluent is accommodated, cleaning with the eluent may be performed. Furthermore, in the first to fifth cleaning patterns, cleaning with the rinse solution and the eluent as being combined may be performed. For example, after the flow path is cleaned with the rinse solution, the flow path may be cleaned with the eluent.

The first to fifth cleaning patterns are described with reference to the example in which the flow path includes high-pressure valve 180A. In liquid chromatographic system 10, however, the flow paths including respective high-pressure valves 180B to 180D can naturally be cleaned similarly in the first to fifth cleaning patterns. The description above is similarly applicable also to the flow paths including respective high-pressure valves 180B to 180D.

An example in which the flow path defined in liquid chromatographic system 10 is cleaned in various cleaning patterns while a sample is being analyzed or preparation for analysis is being made in one of first analysis flow path 291A to fourth analysis flow path 291D will now be described with reference to FIGS. 16 to 19.

<Example of Cleaning During Suction of Sample>

Figure 16:
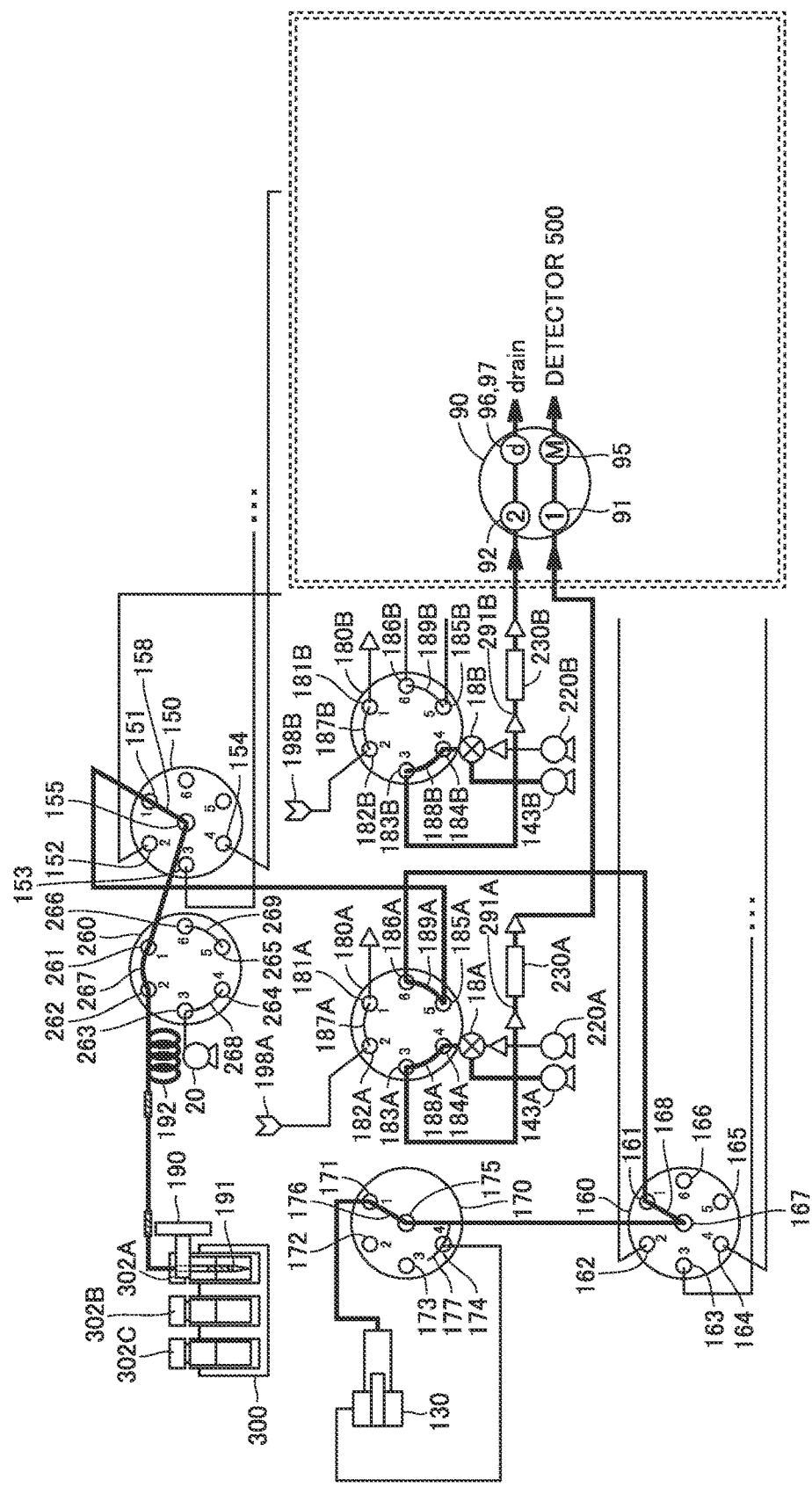
FIG. 16 is a diagram showing an example in which a flow path is cleaned in the third cleaning pattern and the fourth cleaning pattern during suction of the sample.

FIG. 16 is a diagram showing an example in which a flow path is cleaned in the third cleaning pattern and the fourth cleaning pattern during suction of the sample. In particular, an example in which, during suction of the sample, first analysis flow path 291A is cleaned in the third cleaning pattern and second analysis flow path 291B is cleaned in the fourth cleaning pattern will be described.

In FIG. 16, first selector valve 150 and second selector valve 160 are connected to high-pressure valve 180A. In diverter valve 90, port 91 leading to column 230A and port 95 leading to detector 500 are connected to each other. Therefore, the sample is ready for analysis through first analysis flow path 291A including high-pressure valve 180A.

Metering pump 130 is connected to needle 191 with low-pressure valve 170, second selector valve 160, high-pressure valve 180A, first selector valve 150, and needle valve 260 being interposed. Needle 191 is guided to container 302A where the sample is accommodated. Needle 191 sucks the sample from container 302A by application of a negative pressure by metering pump 130.

In high-pressure valve 180B, port 183B and port 184B are connected to each other.

In such a state, liquid chromatographic system 10 can perform cleaning in the third cleaning pattern targeted for first analysis flow path 291A including high-pressure valve 180A and cleaning in the fourth cleaning pattern targeted for second analysis flow path 291B including high-pressure valve 180B.

The rinse solution supplied from cleaning pump 143A to high-pressure valve 180A flows through high-pressure valve 180A, column 230A, and diverter valve 90, and cleans those portions and the flow path leading to detector 500 (third cleaning pattern).

The rinse solution supplied from cleaning pump 143B to high-pressure valve 180B flows through high-pressure valve 180B, column 230B, and diverter valve 90, and cleans the flow path including those portions (fourth cleaning pattern).

Liquid chromatographic system 10 can thus clean first analysis flow path 291A while an operation to suction the sample continues for analysis of the sample through first analysis flow path 291A. Furthermore, liquid chromatographic system 10 can clean second analysis flow path 291B. Liquid chromatographic system 10 can naturally clean third analysis flow path 291C including high-pressure valve 180C and fourth analysis flow path 291D including high-pressure valve 180D together.

<Example of Cleaning During Injection of Sample>

Figure 17:
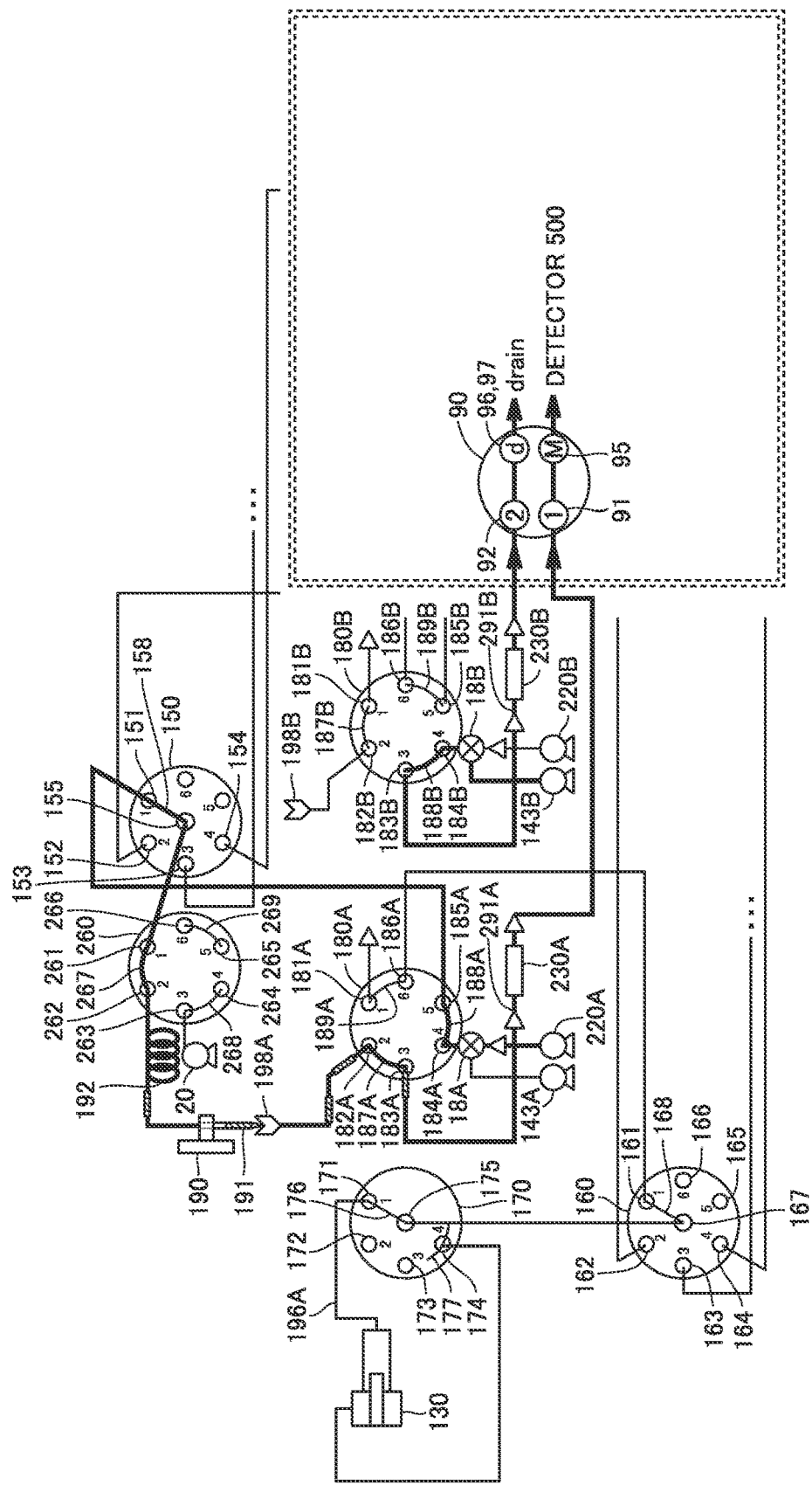
FIG. 17 is a diagram showing an example in which the flow path is cleaned in the fourth cleaning pattern during injection of the sample.

FIG. 17 is a diagram showing an example in which the flow path is cleaned in the fourth cleaning pattern during injection of the sample. In particular, an example in which second analysis flow path 291B is cleaned in the fourth cleaning pattern while the sample is injected into column 230A in first analysis flow path 291A will be described.

In FIG. 17, first selector valve 150 and second selector valve 160 are connected to high-pressure valve 180A. In diverter valve 90, port 91 leading to column 230A and port 95 leading to detector 500 are connected to each other.

High-pressure pump 220A is connected to needle 191 with high-pressure valve 180A, first selector valve 150, and needle valve 260 being interposed. Needle 191 is connected to injection port 198A. The sample is held in sample loop 192. Needle 191 injects the sample in sample loop 192 into injection port 198A, together with the eluent supplied from high-pressure pump 220A. The sample is thus injected into column 230A through high-pressure valve 180A.

In high-pressure valve 180B, port 183B and port 184B are connected to each other.

In such a state, liquid chromatographic system 10 can perform cleaning in the fourth cleaning pattern targeted for second analysis flow path 291B including high-pressure valve 180B. Specifically, by supply of the rinse solution from cleaning pump 143B to high-pressure valve 180B, the flow path including high-pressure valve 180B, column 230B, and diverter valve 90 can be cleaned (fourth cleaning pattern).

Thus, liquid chromatographic system 10 can clean second analysis flow path 291B while an operation to inject the sample into column 230A in first analysis flow path 291A continues. Liquid chromatographic system 10 can naturally clean third analysis flow path 291C including high-pressure valve 180C and fourth analysis flow path 291D including high-pressure valve 180D together.

<First Example of Cleaning During Analysis of Sample>

Figure 18:
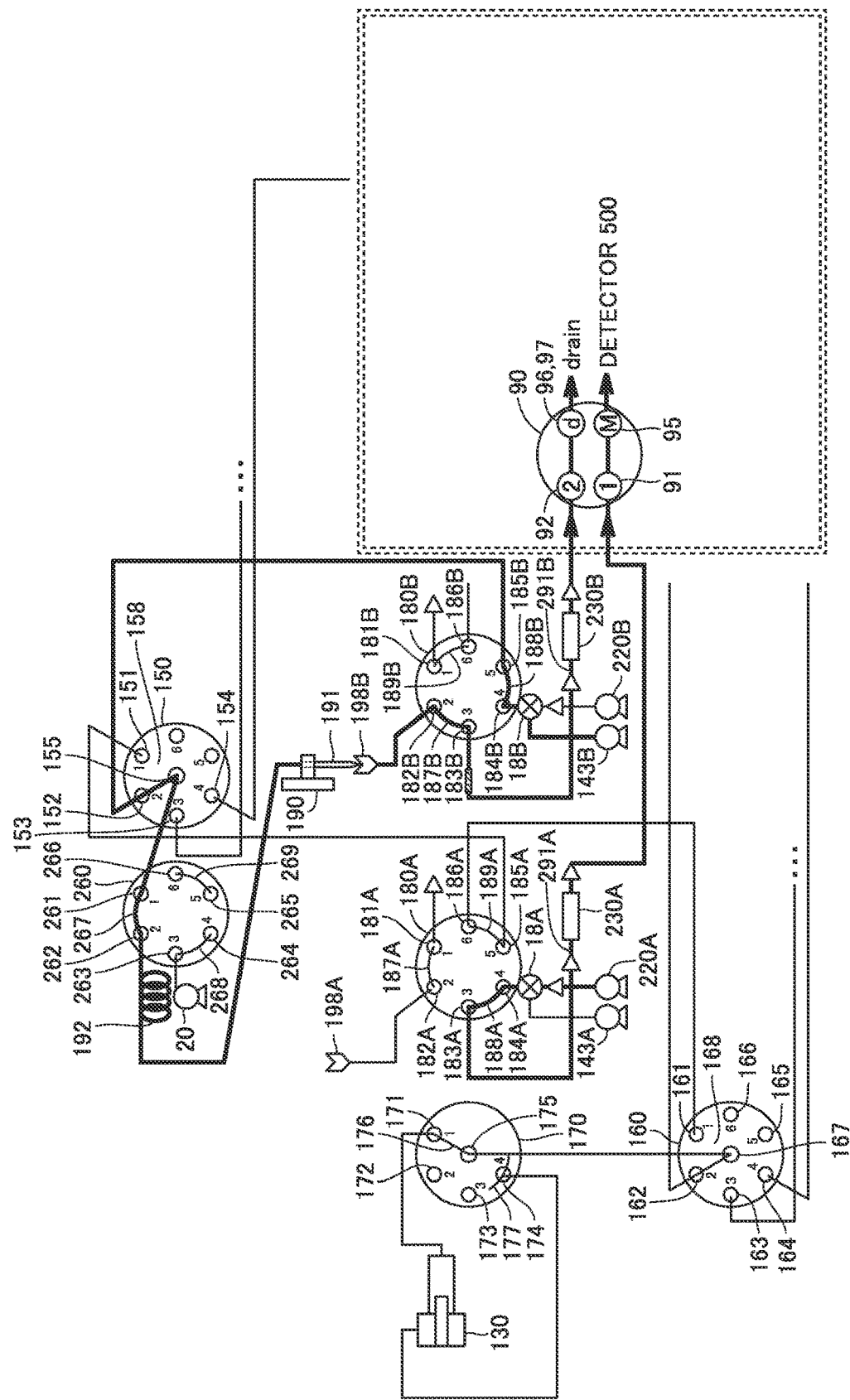
FIG. 18 is a diagram showing an example in which the flow path is cleaned in the second cleaning pattern during analysis of the sample.

FIG. 18 is a diagram showing an example in which the flow path is cleaned in the second cleaning pattern during analysis of the sample. In particular, an example in which second analysis flow path 291B is cleaned in the second cleaning pattern while the sample is being analyzed through first analysis flow path 291A will be described.

In FIG. 18, high-pressure pump 220A is connected to column 230A via high-pressure valve 180A. The sample is accommodated in column 230A. In diverter valve 90, port 91 leading to column 230A and port 95 leading to detector 500 are connected to each other. The eluent supplied from high-pressure pump 220A is injected through high-pressure valve 180A into column 230A where the sample is accommodated. In detector 500, analysis of the sample proceeds.

First selector valve 150 and second selector valve 160 are connected to high-pressure valve 180B. Cleaning pump 143B is connected to needle 191 with high-pressure valve 180B, first selector valve 150, and needle valve 260 being interposed. Needle 191 is guided to injection port 198B.

In such a state, liquid chromatographic system 10 can perform cleaning in the second cleaning pattern targeted for second analysis flow path 291B including high-pressure valve 180B. Specifically, by supply of the rinse solution from cleaning pump 143B to high-pressure valve 180B, the rinse solution flows sequentially through high-pressure valve 180B, first selector valve 150, needle valve 260, sample loop 192, needle 191, injection port 198B, high-pressure valve 180B, column 230B, and diverter valve 90, and the flow path including those portions is cleaned (second cleaning pattern).

Thus, liquid chromatographic system 10 can clean second analysis flow path 291B in the second cleaning pattern while analysis of the sample proceeds in first analysis flow path 291A. Liquid chromatographic system 10 can naturally clean, instead of second analysis flow path 291B, third analysis flow path 291C including high-pressure valve 180C or fourth analysis flow path 291D including high-pressure valve 180D in the second cleaning pattern.

Liquid chromatographic system 10 can also clean second analysis flow path 291B in the fourth pattern while analysis of the sample proceeds in first analysis flow path 291A. Furthermore, while analysis of the sample proceeds in first analysis flow path 291A, liquid chromatographic system 10 can clean second analysis flow path 291B in the second cleaning pattern and also third analysis flow path 291C in the fourth cleaning pattern.

<Second Example of Cleaning During Analysis of Sample>

Figure 19:
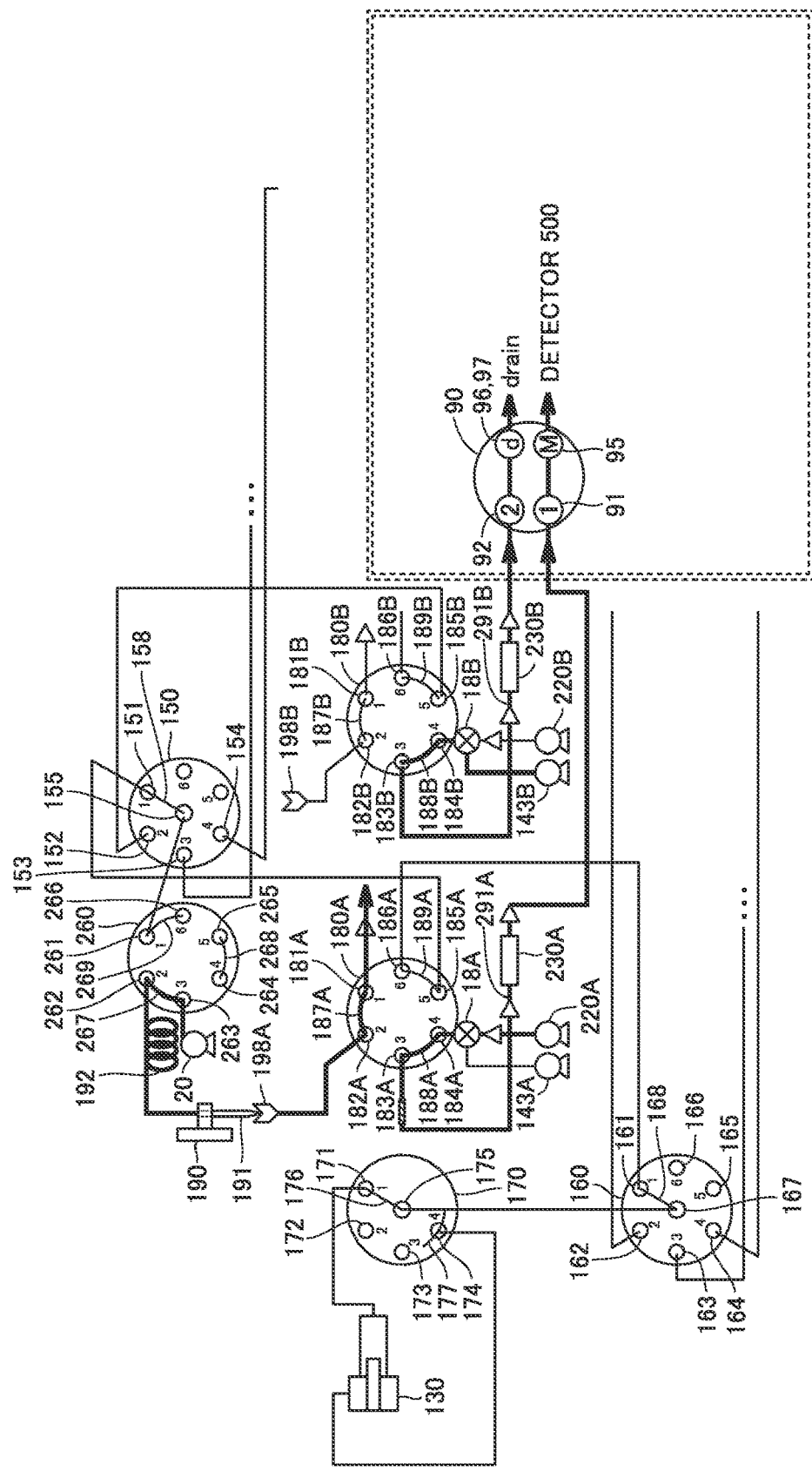
FIG. 19 is a diagram showing an example in which the flow path is cleaned in the fourth cleaning pattern and the fifth cleaning pattern during analysis of the sample.

FIG. 19 is a diagram showing an example in which the flow path is cleaned in the fourth cleaning pattern and the fifth cleaning pattern during analysis of the sample. In particular, an example in which second analysis flow path 291B is cleaned in the fourth cleaning pattern and the flow path including high-pressure valve 180A is cleaned in the fifth cleaning pattern while the sample is being analyzed through first analysis flow path 291A will be described.

In FIG. 19, first selector valve 150 and second selector valve 160 are connected to high-pressure valve 180A. In diverter valve 90, port 91 leading to column 230A and port 95 leading to detector 500 are connected to each other. The eluent supplied from high-pressure pump 220A is injected through high-pressure valve 180A into column 230A where the sample is accommodated. In detector 500, analysis of the sample proceeds.

In needle valve 260, port 262 and port 263 are connected to each other. In high-pressure valve 180B, port 183B and port 184B are connected to each other.

In such a state, liquid chromatographic system 10 can perform cleaning in the fifth cleaning pattern targeted for the flow path including high-pressure valve 180A and cleaning in the fourth cleaning pattern targeted for second analysis flow path 291B including high-pressure valve 180B.

The rinse solution supplied from needle cleaning pump 20 to needle valve 260 flows through needle valve 260, sample loop 192, needle 191, and high-pressure valve 180A and the flow path including those portions is cleaned (fifth cleaning pattern).

The rinse solution supplied from cleaning pump 143B to high-pressure valve 180B flows through high-pressure valve 180B, column 230B, and diverter valve 90 and the flow path including those portions is cleaned (fourth cleaning pattern).

Thus, liquid chromatographic system 10 can perform cleaning in the fifth cleaning pattern targeted for the flow path including high-pressure valve 180A and cleaning in the fourth cleaning pattern targeted for second analysis flow path 291B including high-pressure valve 180B while processing for analyzing the sample through first analysis flow path 291A continues.

Liquid chromatographic system 10 can naturally clean third analysis flow path 291C including high-pressure valve 180C and fourth analysis flow path 291D including high-pressure valve 180D together in the fourth cleaning pattern.

<Types of Selectable Cleaning Patterns>

FIG. 20 is a diagram showing a cleaning pattern that can be selected for first analysis flow path 291A to fourth analysis flow path 291D. FIG. 20 shows, for each of first analysis flow path 291A to fourth analysis flow path 291D, types of selectable cleaning patterns in each stage of three processes that proceed with the use of first analysis flow path 291A.

Various cleaning patterns described so far with reference to FIGS. 10 to 19 are summarized. For example, while first analysis flow path 291A is being used for analysis of the sample, types of selectable cleaning patterns for cleaning of first analysis flow path 291A to fourth analysis flow path 291D are as shown in FIG. 20.

The flow path cleaned in the fifth cleaning pattern is the flow path through which the cleaning solution flows toward ports 181A to 184A which are drain ports of high-pressure valves 180A to 180D. FIG. 20 shows the fifth cleaning pattern in correspondence with first analysis flow path 291A to fourth analysis flow path 291D, as the cleaning pattern relating to first analysis flow path 291A to fourth analysis flow path 291D.

Stages of sample suction, sample injection, and eluent injection shown in FIG. 20 mean a stage of suction of the sample by needle 191, a stage of injection of the sucked sample from needle 191 via injection port 198A and high-pressure valve 180A into column 230A, and a stage of injection of the eluent supplied from high-pressure pump 220A to high-pressure valve 180A into column 230A, respectively.

While the sample is being sucked by needle 191, first analysis flow path 291A to fourth analysis flow path 291D can be cleaned in the third or fourth cleaning pattern. For example, first analysis flow path 291A can be cleaned in the third cleaning pattern and second analysis flow path 291B to fourth analysis flow path 291D can be cleaned in the third cleaning pattern.

While the sucked sample is being injected from needle 191 via injection port 198A and high-pressure valve 180A into column 230A, second analysis flow path 291B to fourth analysis flow path 291D can be cleaned in the third or fourth cleaning pattern. For example, second analysis flow path 291B can be cleaned in the third cleaning pattern and third analysis flow path 291C and fourth analysis flow path 291D can be cleaned in the fourth cleaning pattern.

While the eluent supplied from high-pressure pump 220A to high-pressure valve 180A is being injected into column 230A, first analysis flow path 291A can be cleaned in the fifth cleaning pattern. A portion cleaned at this time includes the needle valve, sample loop 192, needle 191, injection port 198A, port 182A of high-pressure valve 180A, and port 181A of high-pressure valve 180A.

While the eluent supplied from high-pressure pump 220A to high-pressure valve 180A is being injected into column 230A, second analysis flow path 291B to fourth analysis flow path 291D can be cleaned in any one of the second, fourth, and fifth cleaning patterns. For example, second analysis flow path 291B can be cleaned in the second cleaning pattern and third analysis flow path 291C and fourth analysis flow path 291D can be cleaned in the fourth cleaning pattern.

Liquid chromatographic system 10 can thus clean first analysis flow path 291A to fourth analysis flow path 291D in various cleaning patterns. Liquid chromatographic system 10 accepts input of the cleaning pattern to be used for cleaning of each analysis flow path and timing of cleaning.

A user sets the cleaning pattern to be used for cleaning of each analysis flow path and timing of cleaning, with the use of input device 120 (see FIG. 4). Contents of setting are shown on display device 125 (see FIG. 4). Controller 110 (see FIG. 4) sets the cleaning pattern to be used for cleaning of each analysis flow path and timing of cleaning in accordance with an instruction from the user provided to input device 120.

<Exemplary Setting for Cleaning Pattern>

Figure 21:
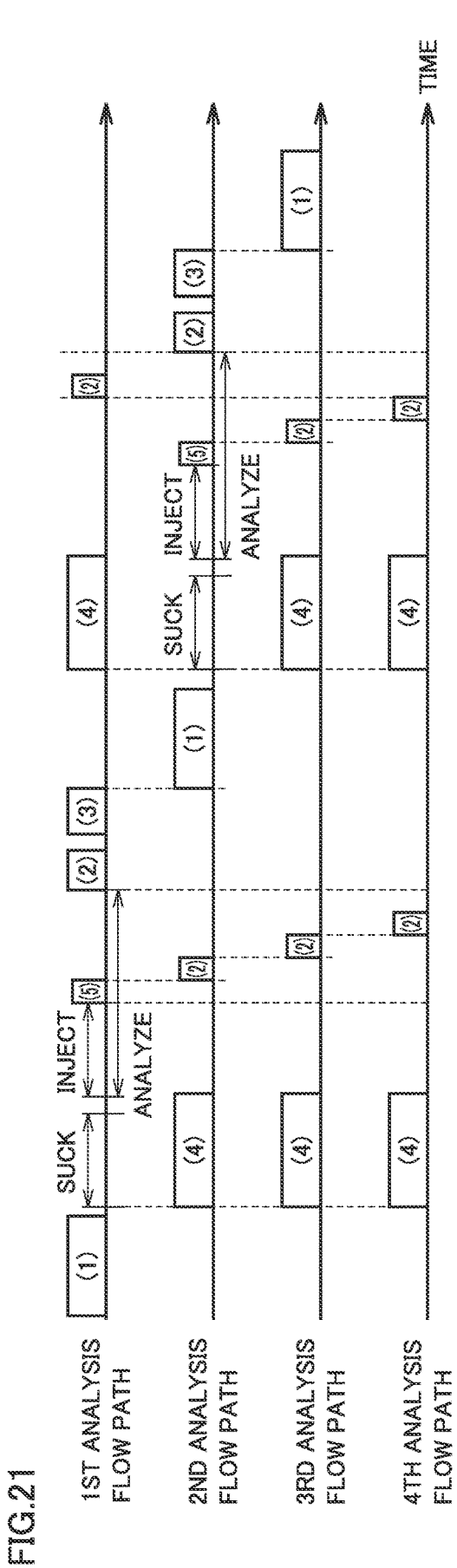
FIG. 21 is a timing chart showing exemplary setting for the cleaning pattern.

FIG. 21 is a timing chart showing exemplary setting for the cleaning pattern. In FIGS. 21, (1) to (5) mean the first to fifth cleaning patterns, respectively. A flow of processing performed by liquid chromatographic system 10 in accordance with the cleaning pattern and the timing of cleaning set in accordance with an instruction from the user will be described with reference to FIG. 21.

Analysis of the sample is conducted with successive use of first analysis flow path 291A to fourth analysis flow path 291D. Initially, first analysis flow path 291A is cleaned in the first cleaning pattern. Thus, the flow path including high-pressure valve 180A, first selector valve 150, needle valve 260, sample loop 192, needle 191, injection port 198A, high-pressure valve 180A, column 230A, and diverter valve 90 is cleaned with the rinse solution. Furthermore, the flow path leading from diverter valve 90 to detector 500 is cleaned with the rinse solution.

Then, the sample is sucked by needle 191 in first analysis flow path 291A. While the sample is sucked by needle 191, second analysis flow path 291B to fourth analysis flow path 291D are cleaned in the fourth cleaning pattern. Thus, for example, in second analysis flow path 291B, the flow path leading from high-pressure valve 180B to column 230B and the flow path leading from column 230B to ports 96 and 97 of diverter valve 90 are cleaned.

As suction of the sample in first analysis flow path 291A ends, processing for injecting the sample together with eluent into column 230A is performed. As all the sample is injected from needle 191, cleaning in the fifth cleaning pattern is performed. The flow path including needle valve 260, sample loop 192, needle 191, injection port 198A, and high-pressure valve 180A is thus cleaned.

As all the sample is injected from needle 191 in first analysis flow path 291A, the state of connection of high-pressure valve 180A is switched and processing for feeding the eluent to the sample injected into column 230A is started. Analysis thus proceeds in detector 500.

While analysis proceeds in first analysis flow path 291A, cleaning in the second cleaning pattern is performed in the order of second analysis flow path 291B to fourth analysis flow path 291D. When analysis ends in first analysis flow path 291A, first analysis flow path 291A is cleaned in the second cleaning pattern and in the third cleaning pattern.

Then, processing for analyzing the sample through second analysis flow path 291B is started. Specifically, an object to which first selector valve 150 and second selector valve 160 are connected is switched from high-pressure valve 180A to high-pressure valve 180B. In succession, second analysis flow path 291B is cleaned in the first cleaning pattern.

Hereafter, as shown in FIG. 21, in a similar procedure, processing for analyzing the sample through second analysis flow path 291B to fourth analysis flow path 291D and processing for cleaning first analysis flow path 291A to fourth analysis flow path 291D are repeated.

<Cleaning With Rinse Solution and Eluent as Being Combined>

Figure 22:
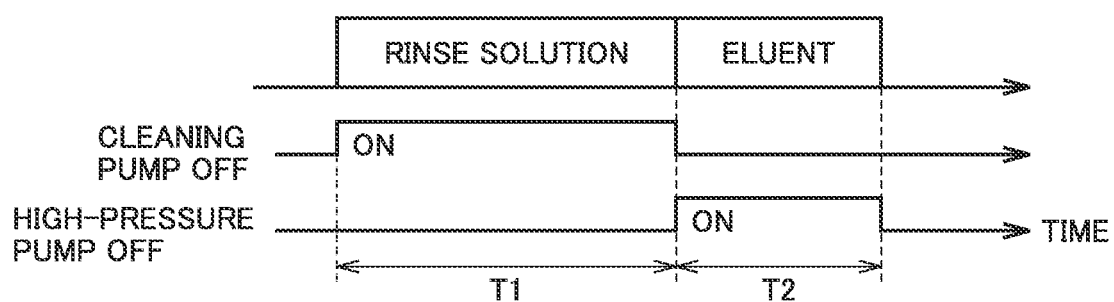
FIG. 22 is a timing chart showing an exemplary pattern of driving a cleaning pump and a high-pressure pump.

FIG. 22 is a timing chart showing an exemplary pattern of driving cleaning pumps 143A to 143D and high-pressure pumps 220A to 220D. Liquid chromatographic system 10 can use the rinse solution and the eluent (blank solution) as the cleaning solution in cleaning of the flow path in the first to fourth cleaning patterns.

For example, in cleaning of first analysis flow path 291A, initially, cleaning pump 143A is driven. The first analysis flow path is thus cleaned with the rinse solution. At a time point of lapse of time T1 since drive of cleaning pump 143A, high-pressure pump 220A instead of cleaning pump 143A is driven. The first analysis flow path is thus cleaned with the eluent. At a time point of lapse of time T2 since drive of high-pressure pump 220A, drive of high-pressure pump 220A is stopped.

According to such a drive pattern, after cleaning with the rinse solution, the eluent flows. Therefore, the mobile phase composed of the eluent can be in equilibrium in columns 230A to 230D. Such a drive pattern may be adopted in all of the first to fourth cleaning patterns. For example, in setting for the cleaning pattern shown in FIG. 21, the rinse solution and the eluent as shown in FIG. 22 may be combined with each other.

Though drive of high-pressure pump 220A is stopped at the time point of lapse of time T2 since drive of high-pressure pump 220A, drive of high-pressure pump 220A does not have to be stopped but high-pressure pump 220A may constantly be driven except for when the rinse solution is supplied from cleaning pump 143A.

<Flow of Processing (Setting)>

Figure 23:
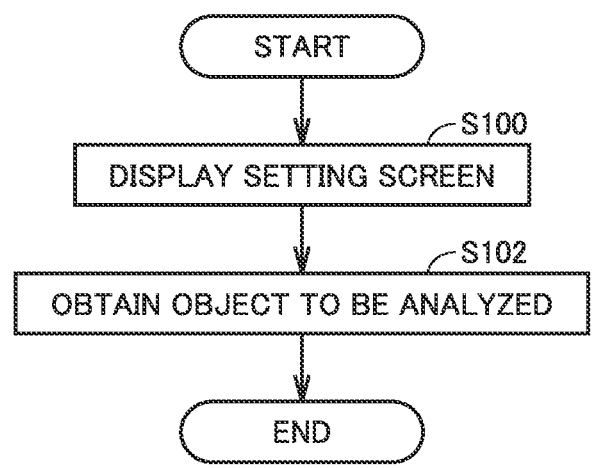
FIG. 23 is a flowchart of processing for accepting an input for setting relating to analysis from a user in a liquid chromatographic system 10.

FIG. 23 is a flowchart of processing for accepting an input for setting relating to analysis from a user in liquid chromatographic system 10. In one implementation, the processing shown in FIG. 23 is performed by execution of a given program by processor 111.

Figure 24:
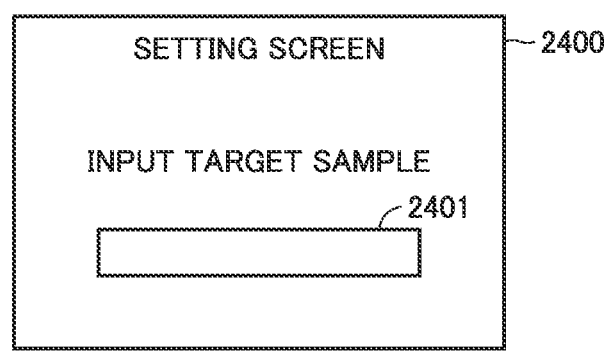
FIG. 24 is a diagram showing an exemplary setting screen.

In step S100, liquid chromatographic system 10 has a setting screen displayed on display device 125. The setting screen accepts an input of information (for example, a name of a compound) that specifies an object to be analyzed. FIG. 24 shows an exemplary setting screen. As shown in FIG. 24, a setting screen 2400 includes an input field 2401 where an input of an object to be analyzed and specifying information are accepted.

Referring back to FIG. 23, in step S102, liquid chromatographic system 10 obtains information specifying the object to be analyzed that has been inputted in the setting screen, and writes the information in memory 112. Thereafter, liquid chromatographic system 10 quits the process in FIG. 23.

<Method File Database>

FIG. 25 is a diagram schematically showing an exemplary data configuration in a method file database. The method file database includes two or more cleaning method files (method file below). Each method file defines contents of analysis and cleaning by liquid chromatographic system 10.

More specifically, FIG. 25 shows four types of method files (1) to (4). Each of method files (1) to (4) includes an analysis method and a cleaning method. In other words, in the method file database, each of one or more analysis methods (analysis conditions) is combined with any one of one or more cleaning methods.

In the example in FIG. 25, the analysis method included in method file (1) includes a value R1 as a setting value of a flow rate of the eluent. According to method file (1), liquid chromatographic system 10 controls the high-pressure pump (high-pressure pump 220A or the like) such that the eluent is delivered at a flow rate R1 to the column (column 230A or the like) in analysis.

The cleaning method included in method file (1) includes a setting value of each of an "execution condition," "a target sample," and a "cleaning content."

The "execution condition" means a condition for selection of each method file. In method file (1), the setting value of the "execution condition" includes "QC value≥V1." The QC value means a result of analysis for quality control of a stream and represents a remaining amount of a compound in the stream. A larger QC value means a larger remaining amount. A specific example of a method of calculating a QC value will be described later with reference to step S208 in FIG. 26. The setting value of the execution condition being "QC value≥V1" means that method file (1) is selected when a value of this result of analysis is equal to or larger than V1.

The "target sample" means an object to be analyzed in liquid chromatographic system 10. In one implementation, in step SiO2, liquid chromatographic system 10 specifies an object to be analyzed (target sample) based on information inputted into the setting screen.

In method file (1), the setting value of the "target sample" includes "K1". The setting value of the target sample being "K1" means selection of method file (1) when the target sample is "K1".

The "cleaning content" means contents performed in cleaning of the stream. In method file (1), the value of the "cleaning content" includes "1st cleaning pattern [10 min]" and "2nd cleaning pattern [10 min]," which means that, for cleaning of the stream, cleaning for ten minutes is performed in the first cleaning pattern (FIG. 11) and thereafter cleaning for ten minutes is performed in the second cleaning pattern (FIG. 12).

Method file (2) is different from method file (1) in setting value of each of the execution condition and the cleaning content. In method file (2), the setting value of the "execution condition" includes "QC value<V1".

In method file (2), the value of the "cleaning content" includes "1st cleaning pattern [5 min]" and "2nd cleaning pattern [5 min]," which means that, for cleaning of the stream, cleaning for five minutes is performed in the first cleaning pattern (FIG. 11) and thereafter cleaning for five minutes is performed in the second cleaning pattern (FIG. 12).

In the example in FIG. 25, when the target sample is "K1" and the condition of QC value≥V1 is satisfied, method file (1) is selected. When the target sample is "K1" and the condition of QC value<V1 is satisfied, method file (2) is selected. Method file (1) is longer than method file (2) in time period for which each of the first cleaning pattern and the second cleaning pattern is performed. The QC value represents magnitude of a remaining amount of a compound in the stream. In other words, in the present embodiment, as the remaining amount of the compound in the stream is larger, the cleaning method longer in time period for cleaning is selected.

Method file (3) is different from method file (1) in setting value of each of the target sample and the cleaning content. In method file (3), the setting value of the "target sample" includes "other than K1."

In method file (3), the value of the "cleaning content" includes "1st cleaning pattern [9 min]" and "second cleaning pattern [9 min]," which means that, for cleaning of the stream, cleaning for nine minutes is performed in the first cleaning pattern (FIG. 11) and thereafter cleaning for nine minutes is performed in the second cleaning pattern (FIG. 12).

In the example in FIG. 25, when the target sample is "K1" and the condition of QC value≥V1 is satisfied, method file (1) is selected. When the target sample is "other than K1" and the condition of QC value≥V1 is satisfied, method file (3) is selected.

Method file (4) is different from method file (2) in setting value of each of the target sample and the cleaning content. In method file (4), the setting value of the "target sample" includes "other than K1."

In method file (4), the value of the "cleaning content" includes "1st cleaning pattern [4 min]" and "second cleaning pattern [4 min]," which means that, for cleaning of the stream, cleaning for four minutes is performed in the first cleaning pattern (FIG. 11) and thereafter cleaning for four minutes is performed in the second cleaning pattern (FIG. 12).

In the example in FIG. 25, when the target sample is "K1" and the condition of QC value<V1 is satisfied, method file (2) is selected. When the target sample is "other than K1" and the condition of QC value<V1 is satisfied, method file (4) is selected.

<Flow of Processing (Analysis)>

Figure 26:
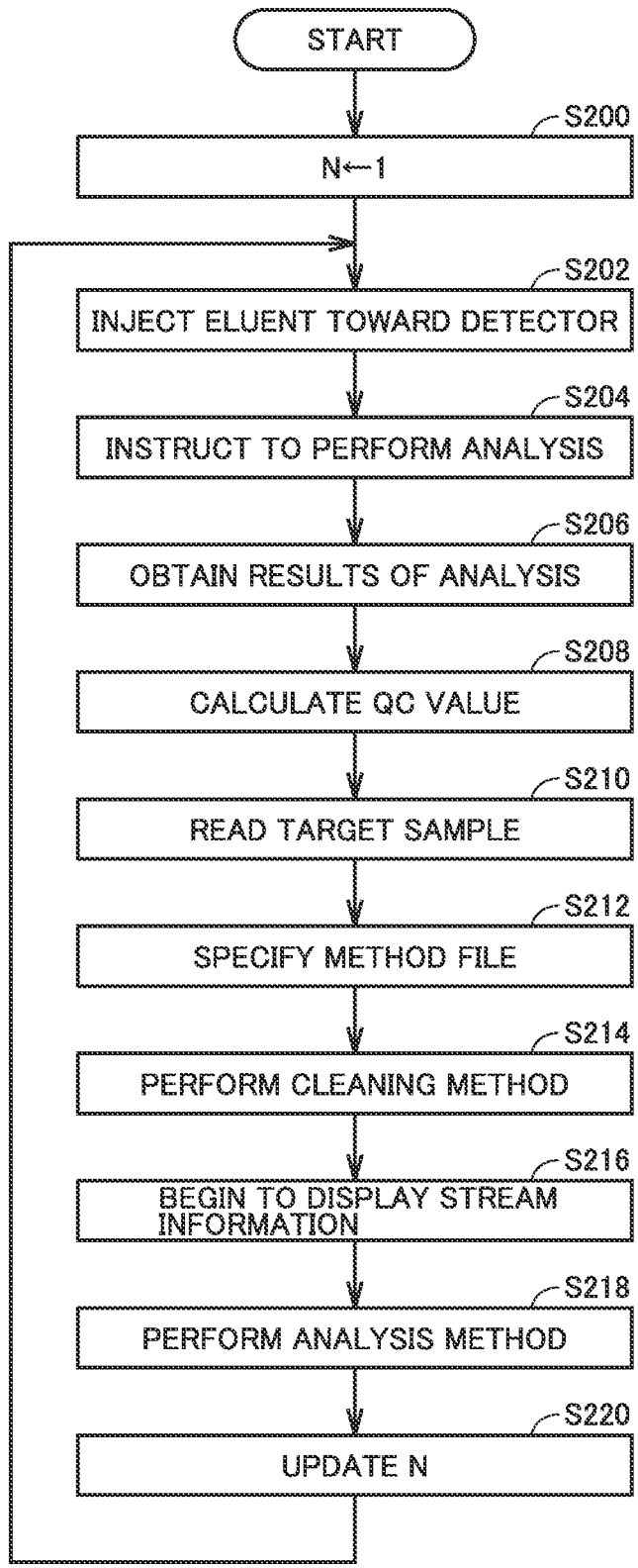
FIG. 26 is a flowchart of processing for analyzing a sample in liquid chromatographic system 10.

FIG. 26 is a flowchart of processing for analyzing a sample in liquid chromatographic system 10. In one implementation, the processing shown in FIG. 26 is performed by execution of a given program by processor 111.

In step S200, liquid chromatographic system 10 sets "1" as a value of a variable N to be used in the processing in FIG. 26. Variable N identifies a stream to be used for analysis among four streams. When the value of variable N is set to "1", the first stream (first analysis flow path 291A) is used for analysis. When the value of variable N is set to "2", the second stream (second analysis flow path 291B) is used for analysis. When the value of variable N is set to "3", the third stream (third analysis flow path 291C) is used for analysis. When the value of variable N is set to "4", the fourth stream (fourth analysis flow path 291D) is used for analysis.

In step S202, liquid chromatographic system 10 has the high-pressure pump (any one of high-pressure pumps 220A to 220D) in the stream deliver the eluent to the stream to be used for analysis to inject the eluent toward detector 500. Control in step S202 corresponds to what is called "blank injection."

In step S204, liquid chromatographic system 10 instructs detector 500 to perform analysis. In response, detector 500 analyzes the eluent injected by "blank injection."

In step S206, liquid chromatographic system 10 obtains from detector 500, results of analysis of the eluent injected by "blank injection."

In step S208, liquid chromatographic system 10 calculates the QC value from the results of analysis obtained in step S206. In one implementation, liquid chromatographic system 10 obtains mass spectrum (MS) data as the results of analysis and then calculates the QC value as a height of a peak other than peaks originating from the eluent in the MS data.

In step S210, liquid chromatographic system 10 reads the target sample obtained in step S102 from memory 112.

In step S212, liquid chromatographic system 10 specifies a method file to be referred to in present analysis among a plurality of method files included in the method file database, based on the QC value calculated in step S208 and the target sample read in step S210. In other words, the QC value calculated in step S208 satisfies a cleaning method "execution condition" in the specified method file. The target sample read in step S210 is included in the "target sample" in the cleaning method in the specified method file.

In step S214, liquid chromatographic system 10 cleans the stream in accordance with the cleaning method in the method file specified in step S212.

Figure 27:
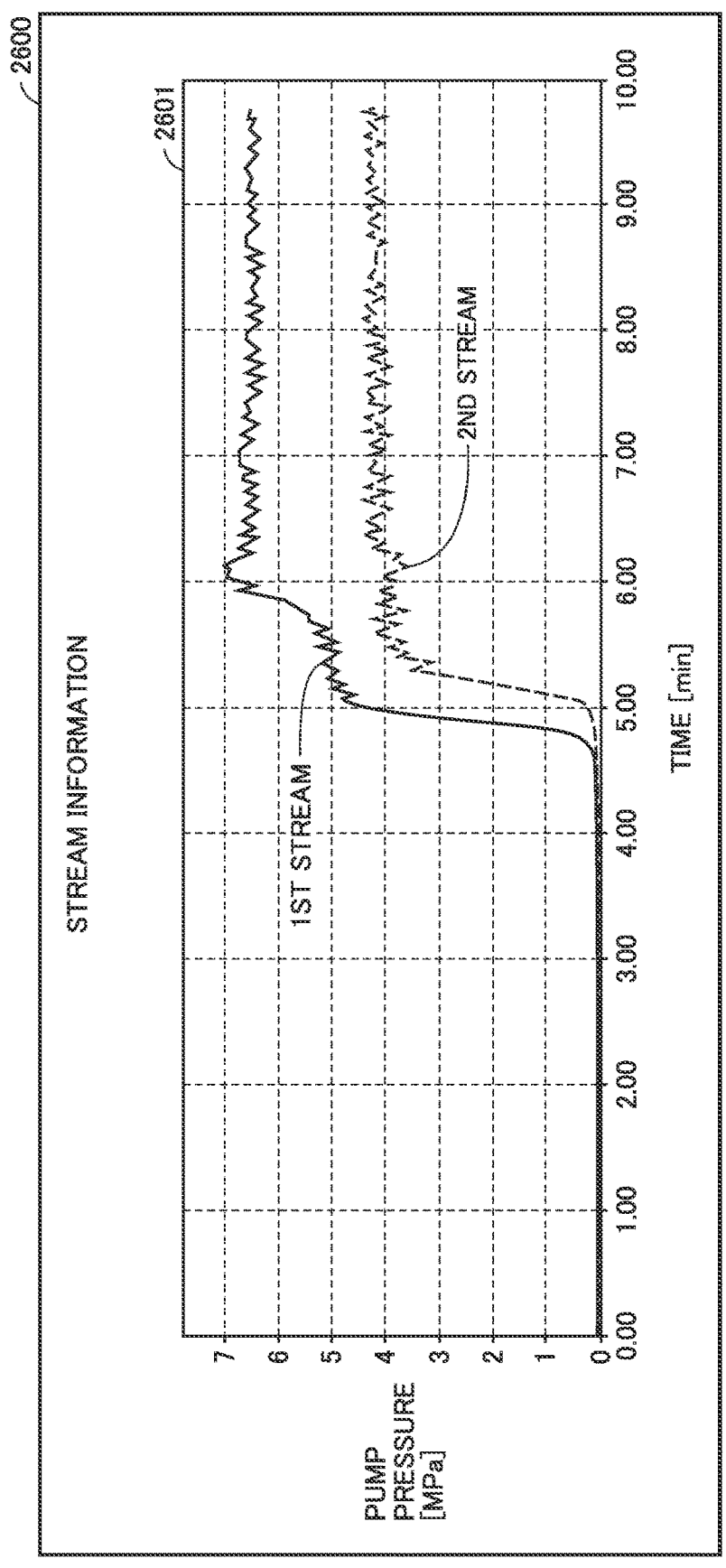
FIG. 27 is a diagram showing an exemplary screen on which stream information is shown.

In step S216, liquid chromatographic system 10 starts display of stream information on display device 125. FIG. 27 is a diagram showing an exemplary screen on which stream information is shown.

A screen 2600 in FIG. 27 includes a graph 2601. Graph 2601 shows change over time of high-pressure pump 220A in the first stream and high-pressure pump 220B in the second stream. The left ordinate of graph 2601 represents a pressure value. The abscissa of graph 2601 represents time.

The example in FIG. 27 shows the pressure value of the high-pressure pump in each of the first stream and the second stream. The pressure value of the high-pressure pump means a pressure at which the high-pressure pump delivers a liquid.

So long as the stream information includes a pressure value of a high-pressure pump in a stream used for analysis, the stream information may include pressure values of high-pressure pumps in all streams or may include only a pressure value of a high-pressure pump in at least one stream. Furthermore, a QC value calculated for each stream may be shown as the stream information. In one implementation, liquid chromatographic system 10 continuously detects the pressure value of the high-pressure pump and continues display of the stream information until the analysis method which will be described later as step S218 ends.

Referring again to FIG. 26, in step S218, liquid chromatographic system 10 analyzes the sample in accordance with the analysis method in the method file specified in step S212.

In step S220, liquid chromatographic system 10 updates the value of variable N. More specifically, when the value of variable N has been set to one of "1" to "3", in step S220, liquid chromatographic system 10 updates the value of variable N to increase by one. When the value of variable N has been set to "4", the liquid chromatographic system updates the value of variable N to "1". The value of variable N thus circulates among "1" to "4". Thereafter, liquid chromatographic system 10 has control return to step S202.

According to the processing described above, liquid chromatographic system 10 obtains results of analysis for quality control of each stream at the time of start of analysis with the use of the stream. Then, liquid chromatographic system 10 specifies a method file to be used for analysis based on the results of analysis for quality control. As the method file is specified, a cleaning method for analysis is specified. The cleaning method defines a mode of cleaning to define a method with which one or more pumps are controlled in cleaning. The one or more pumps include at least one of high-pressure pumps 220A to 220D and cleaning pumps 143A to 143D. As the cleaning method for each stream is specified as above, each stream is cleaned in accordance with a state of each stream. Therefore, according to the present disclosure, a technique for appropriately cleaning each stream is provided.

In liquid chromatographic system 10, a plurality of types of cleaning solutions may be connected to a single pump for cleaning. In the method file database, the cleaning method may define a type of the cleaning solution to be used for cleaning. Liquid chromatographic system 10 specifies a single cleaning method file in step S212 to thereby specify a single cleaning method. As a single cleaning method is specified, the type of the cleaning solution to be used for cleaning is specified. In step S214, liquid chromatographic system 10 may control a manner of connection in liquid chromatographic system 10 such that only a cleaning solution of a type specified to be used for cleaning among the plurality of types of cleaning solutions is connected to the pump for cleaning.

The QC value obtained as results of analysis for quality control is not limited to the value based on MS data. Results of analysis in accordance with an analysis method other than mass spectrometry may be used for calculation of the results of analysis. For example, a liquid chromatogram of a sample that has been subjected to "blank injection" may be used. In this case, the QC value may be calculated from the liquid chromatogram based on a peak value of a peak originating from a compound other than the eluent.

The mode of cleaning includes which of the first to fifth cleaning patterns is selected and/or a length of time for which the cleaning pattern is performed. Each of high-pressure pumps 220A to 220D represents an exemplary drive pump that supplies a mobile phase to a stream.

In liquid chromatographic system 10, four streams (first analysis flow path 291A, second analysis flow path 291B, third analysis flow path 291C, and fourth analysis flow path 291D) are arranged in parallel. When liquid chromatographic system 10 performs cleaning of one stream in accordance with the cleaning method in step S214, it may perform cleaning of another stream with the same cleaning method. Control in liquid chromatographic system 10 including a plurality of streams can thus be facilitated.

After liquid chromatographic system 10 performs the analysis method in step S218, it may perform the cleaning method included in the cleaning method file the same as the cleaning method file including the analysis method in the method file database. In other words, after analysis in accordance with one analysis condition, liquid chromatographic system 10 may have the pump for cleaning driven in accordance with a cleaning method combined with the analysis method in the method file database.

When a sample is being injected into another stream at the time when an attempt at cleaning of another stream in accordance with the cleaning method is made in step S214, liquid chromatographic system 10 may perform cleaning of another stream after end of injection of the sample.

Furthermore, in liquid chromatographic system 10, only a target sample may be used for specifying a method file. Specifically, in the example in FIG. 26, in step S212, a method file to be referred to in present analysis is specified based on both of the QC value calculated in step S208 and the target sample read in step S210. The method file to be referred to in present analysis, however, may be specified based only on the QC value calculated in step S208 or only on the target sample read in step S210.

FIG. 28 is a diagram showing a first modification of the method file database. In the method file database shown in FIG. 28, no target sample is associated with the cleaning method. In this example, in step S212, liquid chromatographic system 10 specifies as the method file to be referred to in analysis, a method file including the QC value calculated in step S208 as the execution condition.

FIG. 29 is a diagram showing a second modification of the method file database. The method file database shown in FIG. 29 includes the target sample as the cleaning method execution condition. In this example, in step S212, liquid chromatographic system 10 specifies as the method file to be referred to in analysis, a method file including the target sample read in step S210 as the execution condition. In this example, the "target sample" is exemplary information that specifies a sample to be analyzed in the stream used for analysis.

[Aspects]

Illustrative embodiments described above are understood by a person skilled in the art as specific examples of aspects below.

(Clause 1) A liquid chromatographic system according to one aspect includes a first column that separates a sample for each component, a first stream which is an analysis flow path including the first column, one or more cleaning pumps that supply a cleaning solution to the first stream, a memory in which two or more combinations of a cleaning method and a cleaning execution condition are stored, and a processor. The processor may be configured to analyze a sample through the first stream and obtain at least one of a result of analysis for quality control of the first stream and information that specifies a sample to be analyzed in the first stream, specify a first combination including an execution condition to which at least one of the result of analysis for quality control and the information corresponds, among the two or more combinations, and drive the one or more cleaning pumps in accordance with the cleaning method included in the first combination.

According to the liquid chromatographic system described in Clause 1, the stream is appropriately cleaned.

(Clause 2) In the liquid chromatographic system described in Clause 1, the processor may obtain the result of analysis for quality control, and the result of analysis for quality control may include a result of analysis of a remaining amount of a component that has passed through the first stream.

According to the liquid chromatographic system described in Clause 2, contamination accumulated in the first stream together with an eluent used as a mobile phase is reflected on the result of analysis for quality control.

(Clause 3) In the liquid chromatographic system described in claim 2, the result of analysis for quality control may include a result of analysis by a mass spectrometry device.

According to the liquid chromatographic system described in Clause 3, a result of mass spectrometry of contamination accumulated in the first stream can be obtained.

(Clause 4) In the liquid chromatographic system described in any one of claims 1 to 3, the one or more cleaning pumps may include a drive pump that supplies a mobile phase to the first stream, and the processor may have change over time of a pressure of delivery by the drive pump and the result of analysis for quality control shown.

According to the liquid chromatographic system described in Clause 4, a user can visually recognize the drive pump and the result of analysis for quality control.

(Clause 5) The liquid chromatographic system described in any one of claims 1 to 4 may further include an input device that accepts input of the information.

According to the liquid chromatographic system described in Clause 5, as the user inputs a type of a sample to be analyzed next, a method of cleaning the stream can be set in accordance with the type of the sample.

(Clause 6) The liquid chromatographic system described in any one of claims 1 to 5 may further include a second stream provided in parallel to the first stream. In the liquid chromatographic system, the processor may carry out control for cleaning in accordance with the first combination for the second stream in response to specifying of the first combination for the first stream.

According to the liquid chromatographic system described in Clause 6, control in the liquid chromatographic system including a plurality of streams can be facilitated.

(Clause 7) In the liquid chromatographic system described in claim 6, the processor may have the second stream cleaned with a method identical to the cleaning method for the first combination in response to specifying of the first combination for the first stream.

According to the liquid chromatographic system described in Clause 7, the plurality of streams can be cleaned with the same method.

(Clause 8) In the liquid chromatographic system described in claim 6, when a sample is injected into the second stream, after this injection, the processor may carry out control for cleaning in accordance with the first combination for the second stream.

According to the liquid chromatographic system described in Clause 8, waste due to cleaning, of the sample being injected into the second stream is avoided.

(Clause 9) In the liquid chromatographic system described in any one of claims 1 to 8, in the two or more combinations, the execution condition may be combined with the method longer in time period for cleaning as a remaining amount of a compound is larger in the first stream indicated in a corresponding result of analysis for quality control.

According to the liquid chromatographic system described in Clause 9, even when a remaining amount of a compound in the first stream is large, the compound can reliably be removed by cleaning.

(Clause 10) A liquid chromatographic system according to another aspect includes a first stream including an analysis flow path, one or more cleaning pumps that supply a cleaning solution to the first stream, a processor, and a memory in which one or more analysis conditions and one or more cleaning methods are stored. In the memory, each of the one or more analysis conditions may be combined with any one of the one or more cleaning methods. The processor may determine to use the first stream for analysis of a sample, and after analysis in accordance with any one analysis condition of the one or more analysis conditions, the processor may have the one or more cleaning pumps driven in accordance with one cleaning method combined with the one analysis condition among the one or more cleaning methods.

According to the liquid chromatographic system described in Clause 10, the stream is appropriately cleaned.

(Clause 11) In the liquid chromatographic system described in any one of claims 1 to 10, a plurality of cleaning solutions may be connected to at least one of the one or more cleaning pumps, and the processor may select one cleaning solution of the plurality of cleaning solutions in accordance with the cleaning method, and have the selected cleaning solution connected to the one or more cleaning pumps.

According to the liquid chromatographic system described in Clause 11, the stream is cleaned with a cleaning solution appropriate for a cleaning method to be performed.

(Clause 12) A cleaning method according to one aspect is a method of cleaning a liquid chromatographic system. The liquid chromatographic system includes a first stream including an analysis flow path including a first analysis column, one or more pumps that supply a liquid to the first stream, and a memory in which two or more combinations of a cleaning method and a cleaning execution condition are stored. The cleaning method includes determining to use the first stream for analysis of a sample, obtaining at least one of a result of analysis for quality control of the first stream and information that specifies a sample to be analyzed in the first stream in response to determination to use the first stream for analysis of the sample, specifying a first combination including an execution condition to which at least one of the result of analysis for quality control and the information corresponds, among the two or more combinations, and driving the one or more pumps in accordance with the cleaning method included in the first combination.

According to the cleaning method described in Clause 12, in the liquid chromatographic system, the stream is appropriately cleaned.

(Clause 13) A computer readable medium according to one aspect is a non-transitory computer readable medium having a program recorded thereon. The program, when executed by a processor of a controller, may cause the controller to perform determining to use, in a liquid chromatographic system, for analysis of a sample, a first stream including an analysis flow path including a first analysis column, obtaining at least one of a result of analysis for quality control of the first stream and information that specifies a sample to be analyzed in the first stream in response to determination to use the first stream for analysis of the sample, specifying, among two or more combinations of a cleaning method and a cleaning execution condition, a first combination including an execution condition to which at least one of the result of analysis for quality control and the information corresponds, and driving one or more pumps that supply a liquid to the first stream in accordance with the cleaning method included in the first combination.

According to the computer readable medium described in Clause 13, in the liquid chromatographic system, the stream is appropriately cleaned.

It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

What is claimed is:

1. A liquid chromatographic system comprising:
   a first column that separates a sample for each component;
   a first stream which is an analysis flow path including the first column;
   one or more cleaning pumps that supply a cleaning solution to the first stream;
   a memory in which two or more combinations of a cleaning method and a cleaning execution condition are stored; and
   a processor, wherein
   the processor is configured to
      analyze a sample through the first stream and obtain at least one of a result of analysis for quality control of the first stream and information that specifies a sample to be analyzed in the first stream,
      specify a first combination including an execution condition to which at least one of the result of analysis for quality control and the information corresponds, among the two or more combinations, and
      drive the one or more cleaning pumps in accordance with the cleaning method included in the first combination.

2. The liquid chromatographic system according to claim 1, wherein
   the processor obtains the result of analysis for quality control, and
   the result of analysis for quality control includes a result of analysis of a remaining amount of a component that has passed through the first stream.

3. The liquid chromatographic system according to claim 2, wherein
   the result of analysis for quality control includes a result of analysis by a mass spectrometry device.

4. The liquid chromatographic system according to claim 1, wherein
   the one or more cleaning pumps include a drive pump that supplies a mobile phase to the first stream, and
   the processor has change over time of a pressure of delivery by the drive pump and the result of analysis for quality control shown.

5. The liquid chromatographic system according to claim 1, further comprising an input device that accepts input of the information.

6. The liquid chromatographic system according to claim 1, further comprising a second stream provided in parallel to the first stream, wherein
   the processor carries out control for cleaning in accordance with the first combination for the second stream in response to specifying of the first combination for the first stream.

7. The liquid chromatographic system according to claim 6, wherein
   the processor has the second stream cleaned with a method identical to the cleaning method for the first combination in response to specifying of the first combination for the first stream.

8. The liquid chromatographic system according to claim 6, wherein
   when a sample is injected into the second stream, after this injection, the processor carries out control for cleaning in accordance with the first combination for the second stream.

9. The liquid chromatographic system according to claim 1, wherein
   in the two or more combinations, the execution condition is combined with the method longer in time period for cleaning as a remaining amount of a compound is larger in the first stream indicated in a corresponding result of analysis for quality control.

10. A liquid chromatographic system comprising:
    a first stream including an analysis flow path;
    one or more cleaning pumps that supply a cleaning solution to the first stream;
    a processor; and
    a memory in which one or more analysis conditions and one or more cleaning methods are stored, wherein in the memory, each of the one or more analysis conditions is combined with any one of the one or more cleaning methods, and the processor determines to use the first stream for analysis of a sample, and after analysis in accordance with any one analysis condition of the one or more analysis conditions, the processor has the one or more cleaning pumps driven in accordance with one cleaning method combined with the one analysis condition among the one or more cleaning methods.

11. The liquid chromatographic system according to claim 10, wherein a plurality of cleaning solutions are connected to at least one of the one or more cleaning pumps, and the processor selects one cleaning solution of the plurality of cleaning solutions in accordance with the cleaning method, and has the selected cleaning solution connected to the one or more cleaning pumps.

12. A method of cleaning a liquid chromatographic system, the liquid chromatographic system including a first stream including an analysis flow path including a first analysis column, one or more pumps that supply a liquid to the first stream, and a memory in which two or more combinations of a cleaning method and a cleaning execution condition are stored, the method comprising:

determining to use the first stream for analysis of a sample;

obtaining at least one of a result of analysis for quality control of the first stream and information that specifies a sample to be analyzed in the first stream in response to determination to use the first stream for analysis of the sample;

specifying a first combination including an execution condition to which at least one of the result of analysis for quality control and the information corresponds, among the two or more combinations; and driving the one or more pumps in accordance with the cleaning method included in the first combination.

13. A non-transitory computer readable medium having a program recorded thereon, the program, when executed by a processor of a controller, causing the controller to perform:

determining to use, in a liquid chromatographic system, for analysis of a sample, a first stream including an analysis flow path including a first analysis column;

obtaining at least one of a result of analysis for quality control of the first stream and information that specifies a sample to be analyzed in the first stream in response to determination to use the first stream for analysis of the sample;

specifying, among two or more combinations of a cleaning method and a cleaning execution condition, a first combination including an execution condition to which at least one of the result of analysis for quality control and the information corresponds; and driving one or more pumps that supply a liquid to the first stream in accordance with the cleaning method included in the first combination.

* * * * *